US011897152B2

(12) United States Patent
Niles

(10) Patent No.: US 11,897,152 B2
(45) Date of Patent: Feb. 13, 2024

(54) BACK AND BODY HAIR CUTTING DEVICES, AND RELATED METHODS OF USE

(71) Applicant: Bakscape Holding Corp., Spruce Grove (CA)

(72) Inventor: Martin S. Niles, Spruce Grove (CA)

(73) Assignee: BAKSCAPE HOLDING CORP., Spruce Grove (CA)

( * ) Notice: Subject to any disclaimer, the term of this patent is extended or adjusted under 35 U.S.C. 154(b) by 0 days.

(21) Appl. No.: 17/570,627

(22) Filed: Jan. 7, 2022

(65) Prior Publication Data

US 2022/0126467 A1 Apr. 28, 2022

Related U.S. Application Data

(63) Continuation of application No. 16/494,248, filed as application No. PCT/CA2018/050309 on Mar. 14, 2018, now Pat. No. 11,224,980.

(60) Provisional application No. 62/471,039, filed on Mar. 14, 2017.

(51) Int. Cl.

*B26B 19/38* (2006.01)
*B26B 19/06* (2006.01)
*B26B 19/14* (2006.01)

(52) U.S. Cl.

CPC ........ *B26B 19/386* (2013.01); *B26B 19/3846* (2013.01); *B26B 19/063* (2013.01); *B26B 19/145* (2013.01)

(58) Field of Classification Search

CPC ... Y10T 83/04; B26B 19/386; B26B 19/3846; B26B 19/063; B26B 19/145; B26B 19/14; B26B 19/16; B26B 19/3853

USPC ........................................... 30/43.4, 47, 537

See application file for complete search history.

(56) References Cited

U.S. PATENT DOCUMENTS

| | | | |
|---|---|---|---|
| 616,554 | A | 12/1898 | O'Rourke |
| 2,081,366 | A | 5/1937 | Joseph |
| 2,294,186 | A | 8/1942 | Kirschbaum |
| 2,931,099 | A | 4/1960 | Schell |
| 3,106,775 | A | 10/1963 | Lew |
| 3,842,443 | A | 10/1974 | Weber |

(Continued)

FOREIGN PATENT DOCUMENTS

| | | | |
|---|---|---|---|
| CA | 1274216 | A | 9/1990 |
| CN | 101151130 | A | 3/2008 |

(Continued)

OTHER PUBLICATIONS

Amazon, Back Shaver Xpreen Stretchable Back Shavers for Men High-Quality Adjustable Back Razor, available before Mar. 14, 2018, 6 pages, URL=https://www.amazon.ca/Shaver-Stretchable-Shavers-High-quality-Adjustable/dp/B076DX1DZC/ref=sr_1_5?s=beauty&ie=UTF8&qid=1521047101&sr=%E2%80%A6.

(Continued)

*Primary Examiner* — Phong H Nguyen
(74) *Attorney, Agent, or Firm* — Robert A. Nissen

(57) ABSTRACT

A back and body hair cutting device has: a hair cutting part; and an elongate handle part. The handle part may be sized to permit a user to remotely manipulate the hair cutting part into contact with all areas of a back of the user. The hair cutting part may be a multidirectional cutting device, for example if the hair cutting part has a multi-directional motorized blade that is structured to define a plurality of directions of skin travel and configured to cut hair when advanced over a skin surface in each of the plurality of directions of skin travel.

16 Claims, 8 Drawing Sheets

(56) References Cited

U.S. PATENT DOCUMENTS

| | | | |
|---|---|---|---|
| 3,925,888 | A | 12/1975 | Bozsanyi |
| 4,299,005 | A | 11/1981 | Brown |
| 4,381,766 | A | 5/1983 | Avolio |
| D276,553 | S | 11/1984 | Landes |
| D294,745 | S | 3/1988 | Mockovak |
| 4,958,432 | A | 9/1990 | Marshall |
| 5,020,182 | A | 6/1991 | Engel |
| 5,240,339 | A | 8/1993 | DeForest |
| 5,360,111 | A | 11/1994 | Arispe |
| 5,396,326 | A | 3/1995 | Knobbe |
| 5,435,328 | A | 7/1995 | Grohoske |
| 5,437,372 | A | 8/1995 | Per-Lee |
| 5,615,962 | A | 4/1997 | Staub |
| 5,659,916 | A | 8/1997 | Beatty |
| 5,671,497 | A | 9/1997 | Abdo |
| 5,673,455 | A | 10/1997 | Per-Lee |
| D387,480 | S | 12/1997 | Esraelian |
| D388,535 | S | 12/1997 | Per-Lee |
| 5,692,261 | A | 12/1997 | Lops |
| D393,102 | S | 3/1998 | Meier |
| 5,915,746 | A | 6/1999 | Melcher |
| 5,991,961 | A | 11/1999 | Zurik |
| D418,248 | S | 12/1999 | Clark |
| D424,238 | S | 5/2000 | Davis |
| 6,098,289 | A | 8/2000 | Wetzel |
| D436,228 | S | 1/2001 | Sulik |
| 6,170,108 | B1 | 1/2001 | Knight |
| 6,189,222 | B1 | 2/2001 | Doyle |
| D440,355 | S | 4/2001 | Nati |
| 6,210,057 | B1 | 4/2001 | Yannaci |
| D447,279 | S | 8/2001 | Altobellis |
| 6,325,564 | B1 | 12/2001 | Knowles |
| D473,343 | S | 4/2003 | Carruba |
| 6,557,204 | B2 | 5/2003 | Maxwell |
| 6,616,364 | B2 | 9/2003 | Katz |
| D490,614 | S | 6/2004 | Katz |
| D518,597 | S | 4/2006 | Sommers |
| D533,308 | S | 12/2006 | Kovac |
| 7,288,863 | B2 | 10/2007 | Kraus |
| 7,361,232 | B2 | 4/2008 | Chasen |
| D572,407 | S | 7/2008 | Cook |
| D587,844 | S | 3/2009 | Slavin |
| D609,871 | S | 2/2010 | Zach |
| D613,906 | S | 4/2010 | Moyer |
| D617,944 | S | 6/2010 | Gonzalez |
| D625,467 | S | 10/2010 | Dickman |
| D636,934 | S | 4/2011 | Chen |
| D637,351 | S | 5/2011 | Huang |
| 8,141,565 | B2 | 3/2012 | Slavin |
| 8,662,774 | B1 | 3/2014 | Wilson |
| 8,967,898 | B1 | 3/2015 | Dayeh |
| 9,027,251 | B2 | 5/2015 | Schmitt |
| 9,079,003 | B1 | 7/2015 | Hoogerwerf |
| D737,516 | S | 8/2015 | Roland |
| 9,212,039 | B1 | 12/2015 | Reidy |
| D763,507 | S | 8/2016 | Teteak |
| D776,877 | S | 1/2017 | Zadro |
| 9,597,488 | B1 | 3/2017 | Jones |
| 9,676,112 | B2 | 6/2017 | Bolcar |
| 9,969,093 | B2 | 5/2018 | Piesker |
| D828,957 | S | 9/2018 | Rosandick |
| D828,958 | S | 9/2018 | Teteak |
| D835,347 | S | 12/2018 | Clarke |
| 10,244,902 | B1 | 4/2019 | Wagner |
| 10,334,994 | B1 | 7/2019 | Burd |
| 10,335,966 | B2 | 7/2019 | Julemont |
| 10,448,724 | B1 | 10/2019 | Wendland |
| D872,371 | S | 1/2020 | Jardin |
| 10,576,646 | B2 | 3/2020 | Schmitt |
| 10,786,123 | B1 | 9/2020 | Chang |
| D919,185 | S | 5/2021 | Yu |
| D919,304 | S | 5/2021 | Yao |
| D928,408 | S | 8/2021 | Meng |
| D940,397 | S | 1/2022 | Champagne |
| 11,224,980 | B2 | 1/2022 | Niles |
| D944,455 | S | 2/2022 | Zhu |
| D977,192 | S | 1/2023 | Niles |
| D984,041 | S | 4/2023 | Morgan |
| 2001/0034920 | A1 | 11/2001 | Brown |
| 2003/0150078 | A1 | 8/2003 | Lottie |
| 2003/0208864 | A1 | 11/2003 | Kohler |
| 2004/0068873 | A1 | 4/2004 | Tona |
| 2005/0198827 | A1 | 9/2005 | Andrew |
| 2005/0201811 | A1 | 9/2005 | Russell |
| 2005/0229398 | A1 | 10/2005 | Leventhal |
| 2006/0075592 | A1 | 4/2006 | Sommers |
| 2006/0085937 | A1 | 4/2006 | Norris |
| 2006/0264788 | A1 | 11/2006 | Chou |
| 2007/0074363 | A1 | 4/2007 | Stewart |
| 2007/0101574 | A1 | 5/2007 | Royle |
| 2007/0157408 | A1 | 7/2007 | Bargiel |
| 2008/0040927 | A1 | 2/2008 | Lau |
| 2008/0205963 | A1 | 8/2008 | Schmidig |
| 2009/0106921 | A1 | 4/2009 | Davitt |
| 2009/0165303 | A1 | 7/2009 | Burgess |
| 2010/0034573 | A1 | 2/2010 | Moyers |
| 2010/0064520 | A1 | 3/2010 | Park |
| 2010/0175259 | A1 | 7/2010 | Shigeta |
| 2010/0301179 | A1 | 12/2010 | Brown |
| 2012/0097183 | A1 | 4/2012 | Miller |
| 2012/0192436 | A1 | 8/2012 | Toy |
| 2013/0298412 | A1 | 11/2013 | Harski |
| 2014/0196292 | A1 | 7/2014 | Schmitt |
| 2015/0013174 | A1 | 1/2015 | Hanamura |
| 2015/0217464 | A1 | 8/2015 | Schmitt |
| 2015/0246213 | A1 | 9/2015 | Arnold |
| 2015/0251326 | A1 | 9/2015 | Lombardo |
| 2016/0310717 | A1 | 10/2016 | Murer |
| 2017/0042387 | A1 | 2/2017 | Hessler |
| 2017/0238769 | A1 | 8/2017 | Van Varick |
| 2017/0367542 | A1 | 12/2017 | Terrell |
| 2018/0093082 | A1 | 4/2018 | Adams |
| 2018/0333566 | A1 | 11/2018 | Follman |
| 2019/0000281 | A1 | 1/2019 | Stanfield |
| 2020/0154954 | A1 | 5/2020 | Mesue |
| 2020/0164532 | A1 | 5/2020 | Schmitt |
| 2020/0237165 | A1 | 7/2020 | Brown |
| 2020/0254638 | A1 | 8/2020 | Khubani |
| 2020/0281344 | A1 | 9/2020 | Agha |
| 2021/0170613 | A1 | 6/2021 | Teteak |

FOREIGN PATENT DOCUMENTS

| | | | |
|---|---|---|---|
| CN | 201745013 | U | 2/2011 |
| CN | 210361419 | U | 4/2020 |
| CN | 210452837 | U | 5/2020 |
| CN | 211030097 | U | 7/2020 |
| CN | 211278503 | U | 8/2020 |
| CN | 111645115 | A | 9/2020 |
| CN | 211916915 | U | 11/2020 |
| CN | 211993080 | U | 11/2020 |
| CN | 112008771 | A | 12/2020 |
| CN | 212312092 | U | 1/2021 |
| CN | 212471575 | U | 2/2021 |
| CN | 212736080 | U | 3/2021 |
| CN | 213054922 | U | 4/2021 |
| CN | 213106942 | U | 5/2021 |
| CN | 213259578 | U | 5/2021 |
| CN | 213592908 | U | 7/2021 |
| CN | 213592910 | U | 7/2021 |
| CN | 213859377 | U | 8/2021 |
| CN | 113334433 | A | 9/2021 |
| DE | 810971 | C | 8/1951 |
| DE | 4130580 | A1 | 3/1993 |
| DE | 29811987 | U1 | 11/1998 |
| DE | 29816829 | U1 | 2/1999 |
| DE | 29820626 | U1 | 2/1999 |
| DE | 19800889 | A1 | 7/1999 |
| DE | 102006044316 | A1 | 3/2008 |
| DE | 202014008300 | U1 | 11/2014 |
| DE | 202015002314 | U1 | 7/2015 |
| EP | 1979137 | A1 | 10/2008 |
| EP | 2985124 | A1 | 2/2016 |
| EP | 3052277 | A1 | 8/2016 |

(56) References Cited

FOREIGN PATENT DOCUMENTS

| | | | |
|---|---|---|---|
| EP | 3103600 | A1 | 12/2016 |
| EP | 3753690 | A1 | 12/2020 |
| FR | 2289302 | A1 | 5/1976 |
| FR | 2430829 | A1 | 2/1980 |
| FR | 2715072 | A1 | 7/1995 |
| GB | 597994 | A | 2/1948 |
| GB | 2348114 | A | 9/2000 |
| GB | 2359986 | A | 9/2001 |
| GB | 2476096 | A | 6/2011 |
| JP | 6441263 | B2 | 12/2018 |
| JP | 2021073044 | A | 5/2021 |
| KR | 20210026700 | A | 3/2021 |
| RU | 2627525 | C1 | 8/2017 |
| WO | 99/58017 | A1 | 11/1999 |
| WO | 2006/115599 | | 11/2006 |
| WO | 2011/011613 | A1 | 1/2011 |
| WO | 2015/024221 | A1 | 2/2015 |
| WO | 2017/168113 | A1 | 10/2017 |
| WO | 2020/028365 | A1 | 2/2020 |
| WO | 2020/258112 | A1 | 12/2020 |
| WO | 2021/053880 | A1 | 3/2021 |
| WO | 2021/149028 | A1 | 7/2021 |

OTHER PUBLICATIONS

Amazon, BaKblade 1.0 Back Hair Removal and Body Shaver, accessed Mar. 12, 2018, 8 pages, URL=https://www.amazon.com/dp/B00BPBLMCS/ref=sspa_dk_detail_1?psc=1&pd_rd_i=B00BPBLMCS&pd_rd_wg=TyyNN&pd_rd_r=A2DHYCVH7K7WP1%E2%80%A6.
Amazon, BaKblade 2.0 Back Hair Removal and Body Shaver, accessed Mar. 12, 2018, 7 pages, URL=https://www.amazon.com/dp/B071JSSF8T/ref=sspa_dk_detail_2?psc=1&pd_rd_i=B071JSSF8T&pd_r d_wg=JIkJ8&pd_rd_r=8C02SDPVSHZZETR953%E2%80%A6.
Amazon, Phillips BG2036/32 Bodygroom Plus, Accessed Mar. 13, 2017, 6 pages, URL=https://www.amazon.ca/Philips%ADBG2036%AD32%ADBodygroom%ADPlus/dp/B008HPYE5W.
Babyliss, Super Crew Cut, accessed Mar. 10, 2018, 2 pages, URL=https://www.babyliss.co.uk/super-crew-cut.html.
Babyliss, The Crewcut: DIY Self Cut Hair Clipper, accessed Dec. 3, 2018, 6 pages, URL=https://www.babyliss.co.uk/the-crewcut%3A-diy-self-cut-hair-clipper-7758U.html.
Backbliss, Back Lotion applicator, accessed Jun. 1, 2021, believed to be available as early as 2017, URL: https://backbliss.com/, 10 pages.
Bakslap, Bakslap Lotion Applicator, accessed Jun. 1, 2021, believed to be available as early as 2019, URL: https://shop.bakslap.com/products/bakslap-lotion-applicator, 5 pages.
Gistgear, Best Lotion Applicators—Buying Guide, accessed Jul. 6, 2022, 66 pages, URL=https://gistgear.com/health-personal-care/medical-supplies-equipment/lotion-applicators.
Emag, Masina tuns parul Remington QuickCut HC4250, accessed Oct. 3, 2018, 11 pages, URL=https://www.emag.ro/masina-tuns-parul-remington-quickcut-1-5-15mm-lame-din-otel-inoxidabil-hc4250/pd/DOYG4YBBM/.
English translation of the official action received on the Chinese application dated Mar. 12, 2020 (11 pages).
English translation of the official action received on the Chinese application dated Oct. 9, 2021 (10 pages).
EUPHNY Self Back Lotion Applicators, posted Feb. 12, 2020, 6 pages, Retrieved from https://www.amazon.co.uk/dp/B084MCX234/?th=1.
European search report and examination received on the corresponding European application, dated Nov. 13, 2020 (10 pages).
Examination report received on the corresponding European application, sendated t Oct. 6, 2021 (8 pages).
Exfoliating Loofah Back Scrubber for Shower, posted Sep. 24, 2020, 6 pages, retreived from www.amazon.co.uk/dp/B08JYTS8NT/.
Groupon, Mangroomer Professional Back-Hair Shaver, accessed Jul. 14, 2017, 3 pages, URL=https://www.groupon.com/deals/gg-mangroomer-professional-back-hair-shaver.
International search report and written opinion received on the corresponding PCT application (7 pages).
Amazon, LFJ Lotion Applicator with Long Curved Handle for Back, earliest review Oct. 24, 2020, retrieved from https://www.amazon.com/dp/B08JTFYSPM, 7 pages.
Amazon, Lotion Applicator for Back, posted Nov. 22, 2022 [online], URL=https://www.amazon.com/dp/B0BN2TB9KC, 10 pages.
Amazon, Manscaped Weed Whacker, URL = https://www.amazon.ca/Manscaped-Weed-Whacker-Best-Trimmer/dp/B087GYN931/, 8 pages.
Mens Hair Guide, Rotary Shavers vs Foil Shavers, accessed Dec. 3, 2018, 11 pages, URL=http://menshair.guide/rotary-and-a-foil-electric-shaver.html.
Official action received on the corresponding Chinese application, dated Mar. 12, 2020 (11 pages).
Official action received on the corresponding Chinese application, dated Oct. 9, 2021 (9 pages).
Amazon, Panasonic Er430K Vacuum Nose/Facial Hair Trimmer, 10 pages, URL=https://www.amazon.ca/Panasonic-Trimmer-Vacuum-Cleaning-System/dp/B000FYVOJC/ref=sr_1_3?dchild=1&geniuslink=true&keywords=panasonic%2Bnose%2Bhair%2 Btrimmer%2Band%2Bear%2Bhair%2Btrimmer%2Ber430k%2Bvacuum%2Bcleaning%2Bsystem%2Bmen%27s%2Bwet%2Bdry%2Bbattery%2Boperated&qid=1628011554&sr=8-3&th=1.
Portable Mini Eyebrow Trimmer Pen, 13 pages, URL = https://www.aliexpress.com/item/4000975033151.html.
Remington, ShortCut™ Pro Body Groomer with Handle, accessed Feb. 16, 2023, believed to be available as early as Feb. 2021, URL: https://www.remingtonproducts.com/products/shave-and-groom/clippers-and-trimmers/face-and-body-trimmers/bht6455ff-shortcut-pro-body-groomer-with-handle.aspx, 6 pages.
Amazon, Sibba 1 Piece Exfoliating Body Scrubber, 7 pages, retrieved from https://www.amazon.co.uk/dp/BOBW93DCNW/.
Bakscape, Starter Kit, earliest comment Jan. 31, 2023 [ online] URL=https://bakscape.com/collections/kits/products/bakscape-starter-kit, 14 pages.
Vive Health, Lotion Applicator, accessed Sep. 29, 2020, 7 pages, URL=https://www.vivehealth.com/products/back-lotion-applicator.
Wahl Micro Groomsman Pen Trimmer, 5 pages, URL =https://www.u-buy.com.tw/en/product/5JAZMI2-wahl-micro-groomsman-lithium-powered-pen-trimmer-black-blue-5640-4701.
Patrick Tran, The SunBuddy Reaches Your Back, published Sep. 23, 2012, 3 pages.
Machine generated translation of foreign reference #2 (CN101151130), generated Aug. 23, 2023, 8 pages.
Machine generated translation of foreign reference #3 (CN111645115), generated Aug. 23, 2023, 15 pages.
Machine generated translation of foreign reference #4 (CN112008771), generated Aug. 23, 2023, 5 pages.
Machine generated translation of foreign reference #5 (CN113334433), generated Aug. 23, 2023, 5 pages.
Machine generated translation of foreign reference #6 (CN201745013), generated Aug. 23, 2023, 7 pages.
Machine generated translation of foreign reference #7 (CN210361419), generated Aug. 23, 2023, 5 pages.
Machine generated translation of foreign reference #8 (CN210452837), generated Aug. 23, 2023, 7 pages.
Machine generated translation of foreign reference #9 (CN211030097), generated Aug. 23, 2023, 8 pages.
Machine generated translation of foreign reference #10 (CN211278503), generated Aug. 23, 2023, 7 pages.
Machine generated translation of foreign reference #11 (CN211916915), generated Aug. 23, 2023, 5 pages.
Machine generated translation of foreign reference #12 (CN211993080), generated Aug. 23, 2023, 5 pages.
Machine generated translation of foreign reference #13 (CN212312092), generated Aug. 23, 2023, 9 pages.
Machine generated translation of foreign reference #14 (CN212471575), generated Aug. 23, 2023, 5 pages.

(56) References Cited

OTHER PUBLICATIONS

Machine generated translation of foreign reference #15 (CN212736080), generated Aug. 23, 2023, 5 pages.
Machine generated translation of foreign reference #16 (CN213054922), generated Aug. 23, 2023, 5 pages.
Machine generated translation of foreign reference #17 (CN213106942), generated Aug. 23, 2023, 5 pages.
Machine generated translation of foreign reference #18 (CN213259578), generated Aug. 23, 2023, 7 pages.
Machine generated translation of foreign reference #19 (CN213592908), generated Aug. 23, 2023, 10 pages.
Machine generated translation of foreign reference #20 (CN213592910), generated Aug. 23, 2023, 9 pages.
Machine generated translation of foreign reference #21 (CN213859377), generated Aug. 23, 2023, 6 pages.
Machine generated translation of foreign reference #22 (DE102006044316), generated Aug. 23, 2023, 11 pages.
Machine generated translation of foreign reference #23 (DE19800889), generated Aug. 23, 2023, 5 pages.
Machine generated translation of foreign reference #24 (DE202014008300), generated Aug. 23, 2023, 8 pages.
Machine generated translation of foreign reference #25 (DE202015002314), generated Aug. 23, 2023, 3 pages.
Machine generated translation of foreign reference #29 (DE4130580), generated Aug. 23, 2023, 9 pages.
Machine generated translation of foreign reference #30 (DE810971), generated Aug. 23, 2023, 8 pages.
Machine generated translation of foreign reference #31 (EP1979137), generated Aug. 23, 2023, 18 pages.
Machine generated translation of foreign reference #32 (EP2985124), generated Aug. 23, 2023, 6 pages.
Machine generated translation of foreign reference #34 (EP3103600), generated Aug. 23, 2023, 6 pages.
Machine generated translation of foreign reference #38 (FR2715072), generated Aug. 23, 2023, 3 pages.
Machine generated translation of foreign reference #43 (JP2021073044), generated Aug. 23, 2023, 16 pages.
Machine generated translation of foreign reference #44 (JP6441263), generated Aug. 23, 2023, 12 pages.
Machine generated translation of foreign reference #45 (KR20210026700), generated Aug. 23, 2023, 12 pages.
Machine generated translation of foreign reference #46 (RU2627525), generated Aug. 23, 2023, 4 pages.
Machine generated translation of foreign reference #49 (WO2015024221), generated Aug. 23, 2023, 8 pages.
Machine generated translation of foreign reference #52 (WO2020258112), generated Aug. 23, 2023, 7 pages.
Machine generated translation of foreign reference #53 (WO2021053880), generated Aug. 23, 2023, 6 pages.

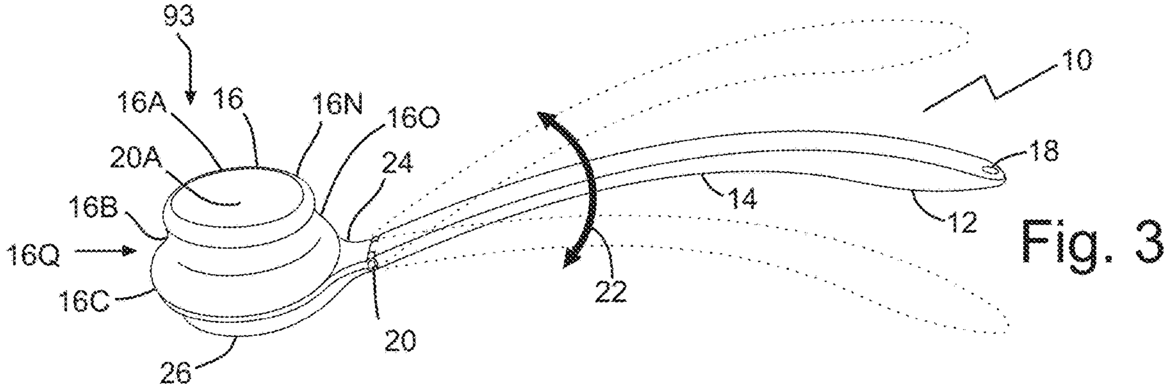
Fig. 3
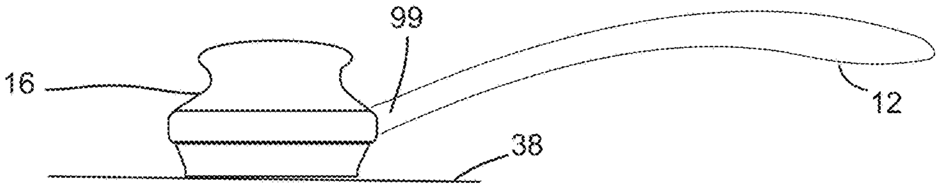
Fig. 3A
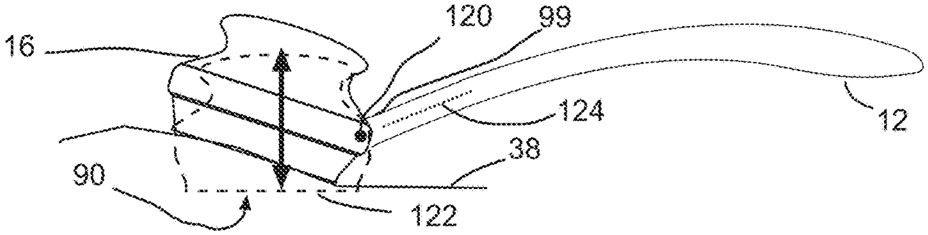
Fig. 3B
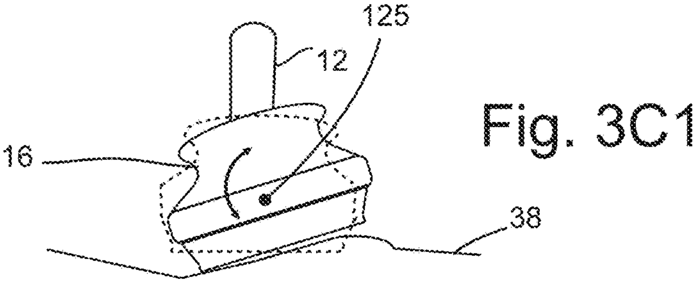
Fig. 3C1
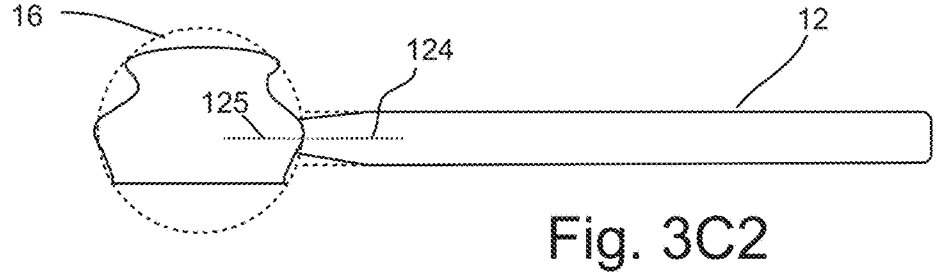
Fig. 3C2

BACK AND BODY HAIR CUTTING DEVICES, AND RELATED METHODS OF USE

TECHNICAL FIELD

This document relates to back and body hair cutting devices, and related methods of use.

BACKGROUND

A conventional handheld hair and body shaving device, such as a pair of clippers, may be used to shave the hair of a user. Common shaving devices often incorporate a static and reciprocating blade arranged to permit the device to travel over a skin surface in a single direction or along an axis that includes forward and backward directions. A short, integral handle may extend from the blade head, particularly in the case of handheld beard shaving devices and head hair clippers, to permit a user to grip the device at a position closely adjacent the head to make skillful cutting maneuvers. Difficult to reach areas of the body may be accessed by employing a second person to operate the shaving device.

SUMMARY

A back and body hair cutting device is disclosed comprising: a hair cutting part; and an elongate handle part, which may be sized to permit a user to remotely manipulate the hair cutting part into contact with all areas of a back of the user.

A back and body hair cutting device comprising: a hair cutting part that has a blade that is structured to define a plurality of directions of skin travel, including forward and lateral directions of skin travel, and configured to cut hair when advanced over a skin surface in each of the plurality of directions of skin travel; and an elongate handle part sized to permit a user to remotely manipulate the hair cutting part into contact with all areas of a back of the user.

A method comprising operating an elongate handle part to manipulate a hair cutting part into contact with a back of the user, in which the hair cutting part has a blade that is structured to define a plurality of directions of skin travel and configured to cut hair when advanced over a skin surface in each of the plurality of directions of skin travel.

A back and body hair cutting device comprising: a hair cutting part that has a blade that is configured to cut hair while being advanced in any direction of skin travel within a 360 degree range of direction of skin travel; and an elongate handle part sized to permit a user to remotely manipulate the hair cutting part into contact with all areas of a back of the user.

A method comprising operating an elongate handle part to manipulate a hair cutting part into contact with a back of the user, in which the hair cutting part has a blade that is configured to cut hair while being advanced in any direction of skin travel within a range of at least 90 degrees, 180 degrees, 270 degrees, or 360 degrees.

A back and body hair cutting device comprising: a hair cutting part that is configured to cut hair while being advanced along each of a forward direction of skin travel, a first lateral direction of skin travel ninety degrees to the left of the forward direction of skin travel, and a second lateral direction of skin travel ninety degrees to the right of the forward direction of skin travel; and an elongate handle part sized to permit a user to remotely manipulate the hair cutting part into contact with all areas of a back of the user.

An apparatus is also disclosed comprising: a hair cutting part; and an elongate handle part extended from the hair cutting part, the elongate handle part being shaped and sized to permit the hair cutting part to reach a lower back of the user while one or both of the following extend backward over a shoulder of the user: a) the elongate handle part and b) a user's hand that grips the elongate handle part.

A method is disclosed comprising: operating an elongate handle part to manipulate a hair cutting part into contact with a back of the user.

A method is disclosed comprising: operating an elongate handle part to manipulate a hair cutting part, which extends from the elongate handle part, into contact with a lower back of a user by one or more of: extending the elongate handle part backward over a shoulder of the user; or gripping the elongate handle part with a first hand and extending the first hand and elongate handle part backward over the shoulder of the user.

A back and body hair cutting device is disclosed comprising: a hair cutting part that has a multi-directional motorized blade that is shaped to define a multi-directional cutting profile, with the multi-directional cutting profile having a plurality of segments, with each segment defining a respective direction of hair-cutting skin travel, of a plurality of directions of hair-cutting skin travel, that is perpendicular to the segment and along which the hair cutting part is advanceable over a skin surface to cut hair at the segment, with two or more segments being oriented non-parallel relative to one another, such that the motorized blade is configured to cut hair when advanced over the skin surface in each of the plurality of directions of hair-cutting skin travel; and an elongate handle part sized to permit a user to remotely manipulate the hair cutting part into contact with all areas of a back of the user.

A method is disclosed comprising operating an elongate handle part to manipulate a hair cutting part into contact with a back of the user to cut hair on the back of the user, in which the hair cutting part has a multi-directional motorized blade that is shaped to define a multi-directional cutting profile, with the multi-directional cutting profile having a plurality of segments, with each segment defining a respective direction of hair-cutting skin travel, of a plurality of directions of hair-cutting skin travel, that is perpendicular to the segment and along which the hair cutting part is advanced over a skin surface to cut hair at the segment, with two or more segments being oriented non-parallel relative to one another, such that the multi-directional motorized blade cuts hair when advanced over the skin surface in each of the plurality of directions of hair-cutting skin travel.

A back and body hair cutting device is disclosed comprising: a hair cutting part; and an elongate handle part, which may be sized to permit a user to remotely manipulate the hair cutting part into contact with all areas of a back of the user, in which the elongate handle part is connected for omni-directional pivoting relative to the hair cutting part.

A back and body hair cutting device is disclosed comprising: a hair cutting part that has a motorized blade that comprises a rotary cutter shaped to cut hair when advanced over a skin surface in an infinite number of directions of hair-cutting travel relative to the hair cutting part; and a handle part sized to permit a user to remotely manipulate the hair cutting part into contact with all areas of a back of the user.

In various embodiments, there may be included any one or more of the following features: The blade is configured to cut hair while being advanced in any direction of skin travel within a 360 degree range of direction of skin travel. The blade comprises a rotary cutter. The hair cutting part comprises a pair of cooperating ring cutters. Each of the cooperating ring cutters comprises cutting teeth along an inner circumferential surface of the respective cooperating ring cutter. The back and body hair cutting device comprises a hair collection chamber adjacent the cooperating ring cutters. The hair cutting part is configured to cut hair while being advanced along each of a forward direction of skin travel, a first lateral direction of skin travel ninety degrees to the left of the forward direction of skin travel, and a second lateral direction of skin travel ninety degrees to the right of the forward direction of skin travel. The hair cutting part has a blade that is exposed or shielded during use. The elongate handle part is integrally attached to the hair cutting part. The elongate handle part is removable from, and securable by a reversible connector to, the hair cutting part. The elongate handle part is permanently secured to the hair cutting part. The hair cutting part forms a spool. The spool has flanged ends spaced by a stem to define a finger receiving recess between the flanged ends, in which one of the flanged ends is sized to fit in the palm of a user's hand. The finger receiving recess forms a seat for receiving a seat gripping part of the elongate handle part. The seat gripping part comprises a slot that receives one of the flanged ends of the hair cutting part. The hair cutting part forms a seat for receiving a seat gripping part of the elongate handle part. The seat gripping part comprises a split ring or ring that engages the seat when the elongate handle part is secured to the hair cutting part. The elongate handle part is secured to the hair cutting part via a threaded connection. The elongate handle part forms a sling. The sling is structured to attach the hair cutting part to an intermediate position between opposed handle ends of the sling. Each of the opposed handle ends is shaped to form a respective hand grip. Each respective hand grip comprises a flange. The sling comprises an elastomeric material. The sling does not comprise an elastomeric material. The sling defines an opening that receives, and forms a compression fit with, the hair cutting part. The elongate handle part is connected to pivot relative to the hair cutting part. The elongate handle part is connected for omni-directional pivoting relative to the hair cutting part. The elongate handle part and the hair cutting part are structured to permit the hair cutting part to move relative to the elongate handle part. One or both of the elongate handle part and the hair cutting part are structured to permit the hair cutting part to pivot, relative to the elongate handle part, from a neutral position upon application of a pressure above a predetermined threshold, and to return to the neutral position upon release of the pressure. One or both of the elongate handle part and the hair cutting part are structured to permit the hair cutting part to pivot about an axis that is defined perpendicular to a handle part axis and parallel to a plane that is defined by a cutting end of the hair cutting part. One or both of the elongate handle part and the hair cutting part are structured to permit the hair cutting part to pivot about an axis that is defined parallel to a handle part axis. The elongate handle part is connected to pivot relative to the hair cutting part, for example via a gimbal. The gimbal comprises a multi-axis concentric gimbal set, such as a gimbal ring set. The elongate handle part has a length of at least one foot, for example 12", 16", 20", 24" or more in length. The length of the elongate handle part is defined between a user end of the elongate handle part and the hair cutting part. A length of the handle part is adjustable. The hair cutting part comprises one or more blades, for example a fixed and moving blade or plural moving blades. The hair cutting part comprises a curved blade or blades, for example a pair of cooperating ring cutters; each of the cooperating ring cutters comprises cutting teeth along an inner circumferential surface of the cooperating ring cutter; and operating comprises cutting hair of the user with the pair of cooperating ring cutters. Operating comprises collecting cut hair within a hair collection chamber adjacent the cooperating ring cutters. The elongate handle part is integrally attached to the hair cutting part. Operating comprises securing the elongate handle part to the hair cutting part via a reversible connector. The hair cutting part forms a spool. Operating comprises cutting hair in a handheld mode where the user grips the spool with the user's hand. Operating comprises an extension mode in which the elongate handle part grips the spool. Connecting the elongate handle part to the hair cutting part by either: threading the elongate handle part to the hair cutting part; or connecting a split ring, of the elongate handle part, to the hair cutting part. The elongate handle part forms a sling. The hair cutting part is connected to the sling at an intermediate position between opposed handle ends of the sling, and operating comprises gripping the opposed handle ends with respective hands of the user. Operating comprises pivoting the elongate handle part relative to the hair cutting part.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a perspective view of an embodiment of a back and body hair cutting device with the ability to pivot an elongate handle part into different operating positions relative to a hair cutting part.

FIGS. 3A, 3B, 3C1, and 3C2, are views of a back and body hair cutting device that permits the hair cutting part to pivot about plural axes of rotation. FIG. 3A is a side elevation view of the device in a neutral position on a flat surface. In FIGS. 3B, 3C1, and 3C2, dashed lines are used to indicate an unflexed, neutral position. FIG. 3B illustrates a pitching (up and down) pivoting movement when climbing a sloped surface, while FIGS. 3C1 and 3C2 both illustrate rolling (lateral) pivoting movements when navigating uneven surfaces. FIGS. 3A and 3B are side elevation views, FIG. 3C1 is a front elevation view, and FIG. 3C2 is a top plan view.

DETAILED DESCRIPTION

Immaterial modifications may be made to the embodiments described here without departing from what is covered by the claims.

Unwanted body hair may be removed via a variety of suitable methods, the most common of which include depilation and epilation. Depilation refers to the removal of the part of the hair above the surface of the skin, leaving the root intact under the skin. Common physical forms of depilation include cutting, which includes trimming, clipping, and shaving, for example via static methods such as with a traditional blade tool or scissors, or via motorized methods such as with an electric shaver. Chemical depilatories may be used to dissolve or weaken hair by breaking disulfide bonds that link protein chains of hair. Depilatories may take the form of creams or powders. Depilation may also involve buffing away hair a friction pad or other device that incorporates a rough sandpaper texture.

A common consumer depilation device is an electrically-powered hair clipper/shaver, which may comprise an electric motor, a movable blade that is caused to move by output from the motor, and a stationary blade (or a second movable blade) that is positioned adjacent to the movable blade so that, together, the blades cut hair by shearing action. An electric hair cutting device may have a straight, single or dual cutting blade assembly where each blade includes a linear fixed cutter and a linear movable cutter, each defining a leading edge or cutting profile that collectively define a single direction of skin travel. An electric hair cutting device may comprise an electric motor and a power source, for example an electrical power source. The power source may be a portable power source, for example a battery, or a power cable may be used to plug the device into a wall-mounted A/C outlet to receive power. A rechargeable battery may be used. A beard shaver, also known as an electric razor, may have foil or rotary cutters, with many rotary cutters coming in multi-cutter head arrangements. Rotary electric razors may shave in a plurality of directions.

Epilation refers to the removal of the entire hair from the root. Epilation methods may involve one or more of tweezing, waxing, sugaring, threading, or electrology. A suitable epilation device may be used such as a laser or other pulsed light source. Epilation chemicals may be used such as thanaka powder or hair development inhibiting drugs. Epilation and depilation methods may be combined in a hair removal treatment. Hair removal methods including epilation and depilation methods may require the assistance of trained and/or licensed professionals, assistants, and other personnel, particularly when the target hair-covered area is difficult for the user him or herself to reach unaided.

Figure 1:
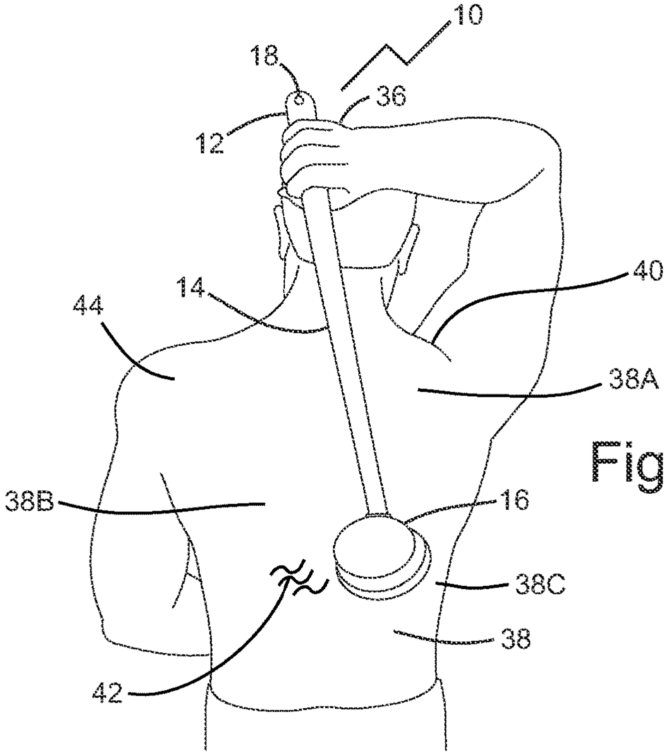
FIGS. 1 and 2 are perspective views illustrating the self-administered use of an embodiment of a back and body hair cutting device to reach and cut hair on a user's lower and mid-back, respectively.

Referring to FIGS. 1-13, a back and body hair cutting device 10 is illustrated comprising a hair cutting part 16 and an elongate handle part 12, for example extended from hair cutting part 16. Referring to FIGS. 1-2, elongate handle part 12 may be sized to permit a user 44 to remotely manipulate hair cutting part 16 into contact with all areas of the user's back 38, including an upper back 38A, a mid-back 38B, and a lower back 38C, of the user 44. The upper back 38A may refer to a portion of the back that overlies, or is laterally adjacent to a part of the back that overlies, the C1 to T4 vertebrae in a user's spine. The mid-back 38B may refer to a portion of the back that overlies, or is laterally adjacent to a part of the back that overlies, the T5 to T12 vertebrae of the user's spine. The mid-back 38B may comprise a central area of roughly ⅓ the surface area of the back 38 the user 44. The lower back 38C may refer to the lumbar section of the user's spine, for example overlying, or laterally adjacent to a part of the back that overlies, the L1 to L5 vertebrae.

Referring to FIGS. 1-2, elongate handle part 12 may have a size and shape that permits self-administered use of hair cutting part 16 on otherwise hard-to-reach areas of the body, for example mid-back 38B. Elongate handle part 12 may be shaped and sized to permit hair cutting part 16 to contact back 38, for example lower back 38C, mid-back 38B, or upper back 38A, of the user 44 when elongate handle part 12 extends backward over a shoulder 40 of the user 44, or a hand 36 of the user that grips the elongate handle part 12 extends backward over a shoulder 40 of the user 44. Elongate handle part 12 may be curved, for example for ergonomic effect or to improve access to the back 38. Elongate handle part 12 may be rigid. In one case a handle part 12 is shaped and size such that a user holds a gripping end of the handle part 12 in front of the user's chest, and the handle part 12 extends up, over the shoulders, and down along the back to the hair cutting part 16. A series of interchangeable handle parts 12 may be provided each with a unique shape and size tailored for a unique target area and/or size of user.

Referring to FIGS. 1-2, elongate handle part 12 may have a suitable length. Elongate handle part 12 may have a length between 10 inches and 30 inches. Elongate handle part 12 may be of sufficient length, for example 12 inches, to permit contact of hair cutting part 16 with the full surface of a user's back. Elongate handle part 12 may be sized relative to a back surface of an average-sized man, for example having a height of 70 inches and an arm length of 25 inches. Elongate handle part 12 may also be sized relative to a back surface of an average-sized woman, for example having a height of 64 inches and an arm length of 23 inches. Sizes and shapes of handle part 12 may also be provided for use on children of various ages and sizes. All references to a user in this document may be understood to refer to an adult male or female of average size unless context dictates otherwise.

Figure 2A:
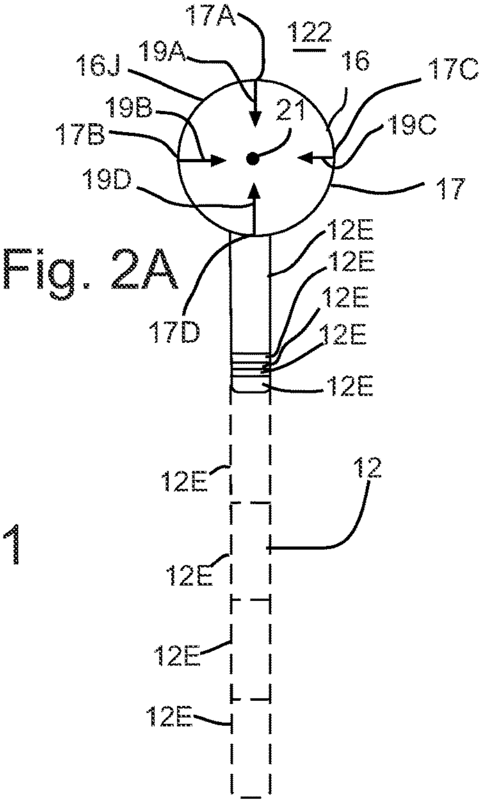
FIG. 2A is a top plan view of a back and body hair cutting device with a telescopic handle.
Figure 2:
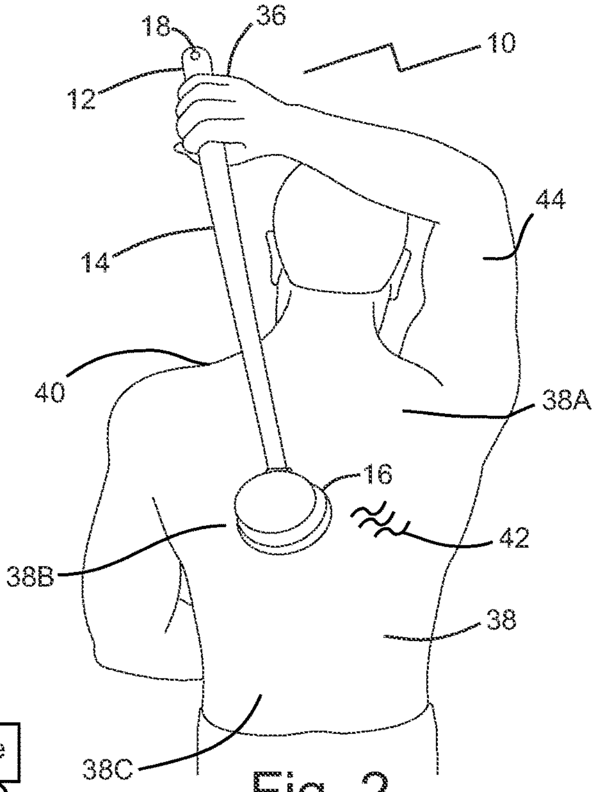

Referring to FIG. 2A, the length of the handle part 12 may be adjustable, for example if a telescopic handle part 12 is used, or if the handle has pivotal or removable parts that can be adjusted or connected/disconnected, respectively, to increase or decrease length. In the example shown, the handle part 12 may comprise plural tubular parts 12E made of varying relative sizes and mounted to slide between a nested position shown in solid lines, and an extended position shown in dashed lines. Other mechanisms may be used to adjust the length of the handle part 12, for example by providing the handle part 12 in plural pieces that pivot relative to one another between a stowed and a deployed position.

Referring to FIGS. 1-2, hair cutting part 16 may have a structure suitable for cutting hair 42, such as a multi-directional blade as shown. A motorized blade is shown. Referring to FIG. 1B, the hair cutting part 16 may have suitable components to motorize the blade, such as a power source 104 (for example an A/C wall plug connector or a battery), a motor 106, and a blade 108 (hair cutting part16). The motor 106 may be connected to oscillate and/or rotate the blade.

Figure 1A:
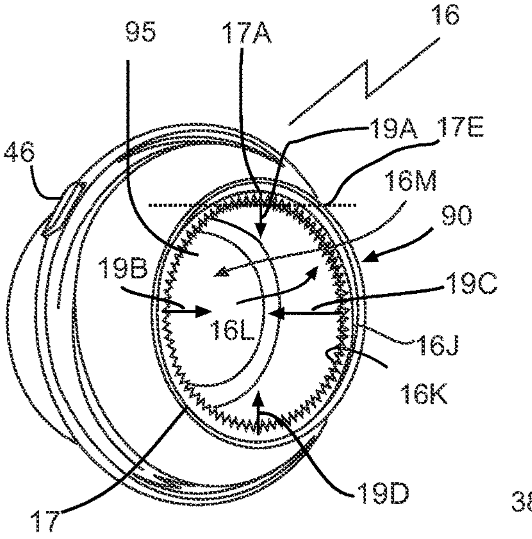
FIG. 1A is a perspective view of a cutting end of a rotary hair cutting part.
Figure 1B:
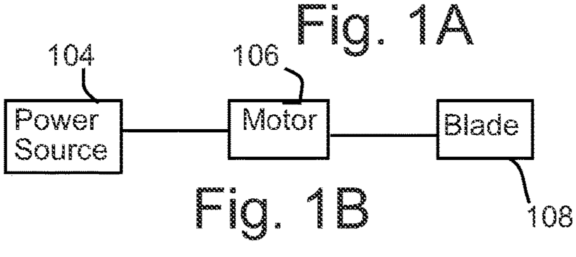
FIG. 1B is a schematic view of the internal components of a hair cutting part.

Referring to FIGS. 1A and 2A, the blade, such as is formed by a ring cutter or cutters 16J, may be shaped to define a multi-directional cutting profile 17. Referring to FIG. 2A, the multi-directional cutting profile 17 (which may be a line such as shown as a circle for a rotary cutter) may have a plurality of segments, such as segments 17A-D, with each segment defining a respective direction, of a plurality of directions (for example directions 19A-D, respectively), of hair-cutting skin travel. Each direction 19A-D may be defined perpendicular to the respective segment 17A-D. Along each direction, for example directions 19A-D, the hair cutting part may be advanceable over a skin surface to cut hair at the respective segment. The segments may be oriented at different non-zero angles relative to one another. The segments may be defined at the interface between cutters where a scissor-action in the blade effectively slices hair that reaches the profile 17 from at least one direction perpendicular to the profile 17 at that segment. Each segment may be defined by the tangent line (such as line 17E in FIG. 1A) defined at that segment. Two or more segments, such as segments 17A and 17B, or 17A and 17C, may be oriented non-parallel relative to one another. The motorized blade may be configured to cut hair when advanced over the skin surface in each of the plurality of directions of hair-cutting skin travel.

The blade or cutting part 16 may be structured for omni-directional cutting. Referring to FIG. 1A, an example is shown of a handheld hair cutting part 16 with a circular profile 17, when viewed from above, and taking a shape of a knob handle. The multi-directional motorized blade may comprise a pair of cooperating ring cutters 16J, for example in which each of the cooperating ring cutters 16J comprise cutting teeth 16K along an inner circumferential surface 16L of the respective cooperating ring cutter 16J. Ring cutters 16J may encircle and define the cutting end 90 of the hair cutting part 16. Cutting teeth may have a suitable shape such as a series of triangular shaped knife blades. Cooperating ring cutters 16J may be positioned coaxial or near coaxial relative to one another. Cooperating ring cutters 16J may have equal or near equal diameters and dimensions, and may be stacked one on top of the other, for example to impart a scissor cutting action when one or both ring cutters of the cooperating ring cutters 16J slide, reciprocate, or rotate relative to one another. The ring cutters may be rotary cutters.

Referring to FIG. 2A, the hair cutting part 16 may be configured to permit a user to cut hair by advancing the device 10 in any of plural directions of hair cutting skin travel within a range of directions of skin travel defined by the hair cutting part 16. In some cases, the hair cutting part is configured to cut hair while being advanced along forward and lateral directions, for example a forward direction of skin travel 19A, a first lateral direction 19B of skin travel ninety degrees, for example to the left or right of the forward direction of skin travel 19A, and a second lateral direction of skin travel 19C ninety degrees to the other of the right or left of the forward direction of skin travel 19A. The directions of skin travel 19A-C may define a part or all of the range of direction of skin travel within which the part 16 is capable of cutting hair. In some cases the range of direction of skin travel may include a rearward direction of skin travel 19D, for example when 360 degrees of skin travel are permitted.

Referring to FIG. 1A, as above in some cases the configuration of the cooperating ring cutters 16J may permit omnidirectionality, for example a 360 degree range of skin travel as shown. Ranges of direction of skin travel discussed within this document may be defined within a plane 122 (FIGS. 2A and 3B) that is defined by a cutting end 90 of the hair cutting part 16. Directions of skin travel may be defined parallel to a skin surface during use, or parallel to a skin-contacting profile defined on a guard 91 or other suitable foot of the hair cutting part 16. Being able to remotely manipulate the hair cutting part about any of a range of advancement, for example 180 to 360 degrees of advancement, or even less than 180 degrees, may improve the ease of use of the device versus a device that has only a single primary cutting direction. A multi-directional hair cutting part may be transitioned between up (forward) and down (backward), left and right, and other directional movements, without having to reposition or rotate the device to face into the desired direction of advancement. Directions of skin travel may be defined by radial lines at different respective angular positions about an axis 21 (FIG. 2A) of the hair cutting part 16, the axis 21 being defined perpendicular to the skin surface during use. A multi-direction hair cutting part may be operated in a fashion analogous to the operation of a back scrubber, with no or minimal loss of hair cutting efficiency when switching between different directions of skin travel. By contrast, a unidirectional hair cutting part may require more dexterity and training to operate, and may take longer to shave a given area of skin. In some cases multidirectional cutting travel may be achieved using curved cutters, or plural cutters angled relative to one another. Referring to FIG. 1A, in some cases, in order to achieve cutting in a particular direction of skin travel 19A, the part 16 may have cooperating cutters that reciprocate relative to one another to define a cutting profile 17 that at some point (segment 17A) is oriented perpendicular to the particular direction of skin travel 19A, to permit the cutters to cut into the direction of skin travel 19A. For illustration a line 17E is defined tangent to the profile 17 at the point (segment 17A) on profile 17 where direction of skin travel 19A is defined, to illustrate the point of intersection between direction of skin travel 19A and profile 17. In FIGS. 1A and 2A leading cutting edge or profile 17 is understood to form a circle that is defined by the oscillating movement of the ring cutters. A curved or ring cutter may be advantageous as such may define an infinite number of possible directions of skin travel along the profile 17, such as along the length of the cutters 16J.

The cutter or cutters may have suitable characteristics. Circular, oval, arcuate, and other cutters may be used. A cutter that defines a convex or concave (shown) profile may be used. Curved, angled, or other non-axial cutters that define a profile 17 that defines a plurality of directions of skin travel include cutters that form less than an entire 360 degree leading cutting edge. The cutter may be structured to define in use a profile 17 that is shaped such that each direction of skin travel, of the plurality of directions of skin travel, is defined at different respective positions along the profile 17, with each direction of skin travel, such as directions 19A-D, defined perpendicular to the profile 17 at the respective position. The cutters themselves may have suitable shapes, such as barbed or other shapes, and may oscillate or rotate along the profile 17.

Figure 6:
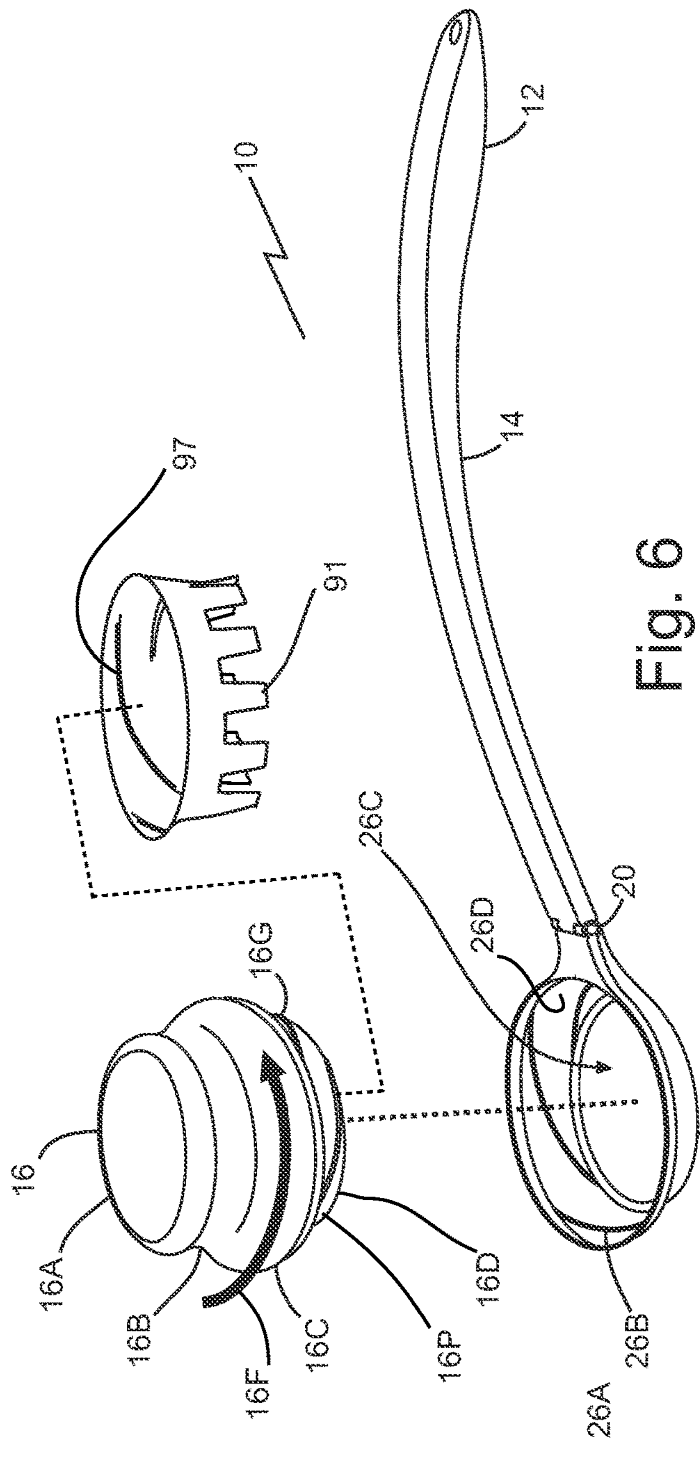
FIGS. 6 and 7 are perspective views illustrating a manner of assembling a handle and hair cutter, of a back and body hair cutting device, via a threaded connection. The hair cutting part of FIG. 6 also illustrates that a cutting guard can be installed to the hair cutting device instead of the elongate handle part.

Referring to FIG. 6, hair cutting part 16 may comprise a cutting guide or guard 91, for example a removable and/or adjustable part that when attached extends beyond the hair cutting end 90 of the part 16. Guard 91 acts to space the part 16 a selected distance away from the cutters 16J, for example to limit the length of hair that the part is able to cut. The guard 91 may comprise a plurality of teeth 103 separated to define gaps through which hair enters a cutting zone adjacent the cutting end 90. Referring to FIG. 1A, hair cutting part 16 may comprise a lock 46 for securing the cutting guard 91 to hair cutting part 16. The guard lock 46 may be a reversible lock that permits removal of the cutting guard from hair cutting part 16 after attachment. Referring to FIG. 6, the threading 16G on hair cutting part 16 may be adapted to selectively couple to cooperating threading 26B and 97 on elongate handle part 12 and guard 91, respectively.

Referring to FIGS. 1A and 6, the cutting blade or cutters 16J may be exposed, for example unshielded, during use. For example the hair cutting part 16 and any guard used thereon may be structured to define an access opening or openings 95 of sufficient width to permit insertion of an average-sized finger of a user into contact with the cutters 16J. For example, access opening 95 may be at least 1 cm in width/diameter or larger, such as 10 cm in width/diameter or larger. The exposed blade may also lack shielding, for example lacking the perforated shielding common to conventional facial hair shaving devices. In other cases the blade may be shielded.

Referring to FIG. 1A, hair cutting part 16 may comprise a hair collection chamber 16M. Chamber 16M may be adapted to collect pieces of hair that are cut by cooperating ring cutters 16J, adjacent the cooperating ring cutters 16J. Ring cutters 16J may encircle and define an entrance for chamber 16M. Hair collection chamber 16M may be positioned in concentric or near concentric alignment or coaxial or near coaxial alignment with cooperating cutters 16J. Chamber 16M may open to the cutting end 90 of the hair cutting part 16.

Referring to FIG. 3, hair cutting part 16 may have a structure suitable for manipulation by a user. Hair cutting part 16 may form a spool 16N, for example that has flanged ends 16A and 16C spaced by a sleeve or stem 16B to define a finger receiving recess 16Q between the flanged ends 16A and 16C. One of the flanged ends, for example flanged end 16A may form a user end 93 of hair cutting part 16, and may be sized to fit in the palm of a user's hand (not shown). The user end 93 may define a convex palm-contacting surface as shown, or may have another suitable shape such as a planar shape. The hair cutting part 16 may be used in a handheld mode where the user directly grips spool 16N with the user's hand with or without the elongate handle part 12 present.

Figures 4, 5:
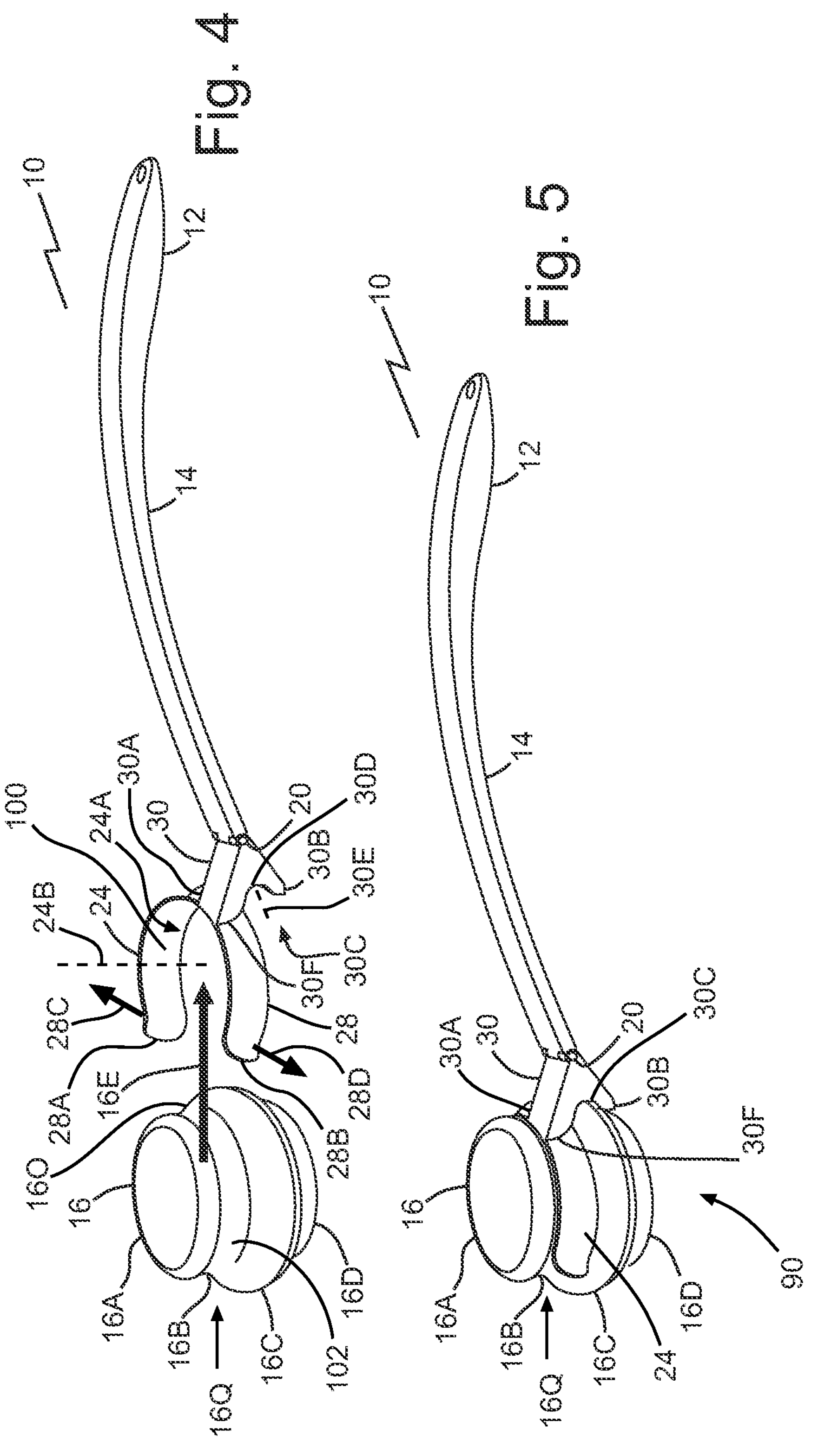
FIGS. 4 and 5 are perspective views illustrating a manner of assembling a handle and hair cutter, of a back and body hair trimming device, via a split ring and spool seat connection.

Referring to FIGS. 4-5, elongate handle part 12 may be structured to selectively connect and disconnect from the hair cutting part 16 at the will of the user. Handle part 12 may be removable from and securable to hair cutting part 16 by a reversible locking part or other connector, such as a seat gripping part 24. Referring to FIG. 4, hair cutting part 16 may form a seat 16O for receiving seat gripping part 24 of elongate handle part 12. Seat gripping part 24 may comprise a split ring 28 that engages the seat 16O to secure the handle part 12 to hair cutting part 16. In some cases, finger receiving recess 16Q forms the seat 16O for receiving seat gripping part 24, such as split ring 28. Pivoting jaws may be used instead of or in addition to a split ring 28.

Referring to FIG. 4, seat gripping part 24 and hair cutting part 16 may mate with one another via a suitable mechanism, for example a press fit, a latch, threading, magnets, fasteners, tethers, or other connection mechanisms. Seat gripping part 24 may have a suitable shape such as a U shape, a horseshoe shape, an open-collar shape, or other shape suitable for mating with seat 16O. Seat gripping part 24 and seat 16O may mate with one another in a fashion that secures the part 16 to the handle part 12 but permits limited relative movement, for example rotation or swiveling of the hair cutting part 16 about the seat gripping part 24. Seat gripping part 24 may have a pair of resilient arms that spread outward in opposed directions 28C and 28D upon at least initial contact with seat 16O when connecting or disconnecting the parts 12 and 16. Such a configuration may facilitate entry, for example in a lateral direction 16E, and exit in reverse, of hair cutting part 16 into and out of seat gripping part 24, respectively.

Referring to FIG. 4, contact surfaces of seat gripping part 24 and hair cutting part 16 may have corresponding shapes, such as corresponding curved shapes as shown. In the example shown, contact surfaces, such as defined by an inner wall surface 100 of seat gripping part 24, and an outer wall 102 of hair cutting part 16, may each follow a portion or the entirety of a respective circumferential path. A maximum diameter of the contact surface of seat gripping part 24 may be smaller than a maximum diameter of the corresponding contact surface of seat 16O.

Referring to FIGS. 4-5, the elongate handle part 12 may connect to the hair cutting part 16 via two or more connection mechanisms. In the example shown, the handle part 12 connects via a slot 30C that receives one or more of the flanged ends 16A or 16C, for example wraps around an edge of flanged end 16C, of hair cutting part 16. In the example shown, the handle part 12 connects to cutting part 16 via both a split ring 28 and slot 30C. As shown the slot 30C may form a positioning guide that cooperates with the seat gripping part 24 to direct and retain the handle part 16 securely into and within, respectively, a selected operating orientation relative to the handle part 12. Referring to FIG. 4, an axis 30E of slot 30C may be angled relative to, for example perpendicular to, an axis 24B of a channel 24A of the seat gripping part 24 to restrict movement during use of part 16 in plural axes of motion. Slot 30C may be formed by a part with a suitable shape, such as V-shape structure 30, for example having a first arm 30A and a second arm 30B joined at an apex 30D. Seat gripping part 24 may be mounted to an end 30F of first arm 30A.

Figure 7:
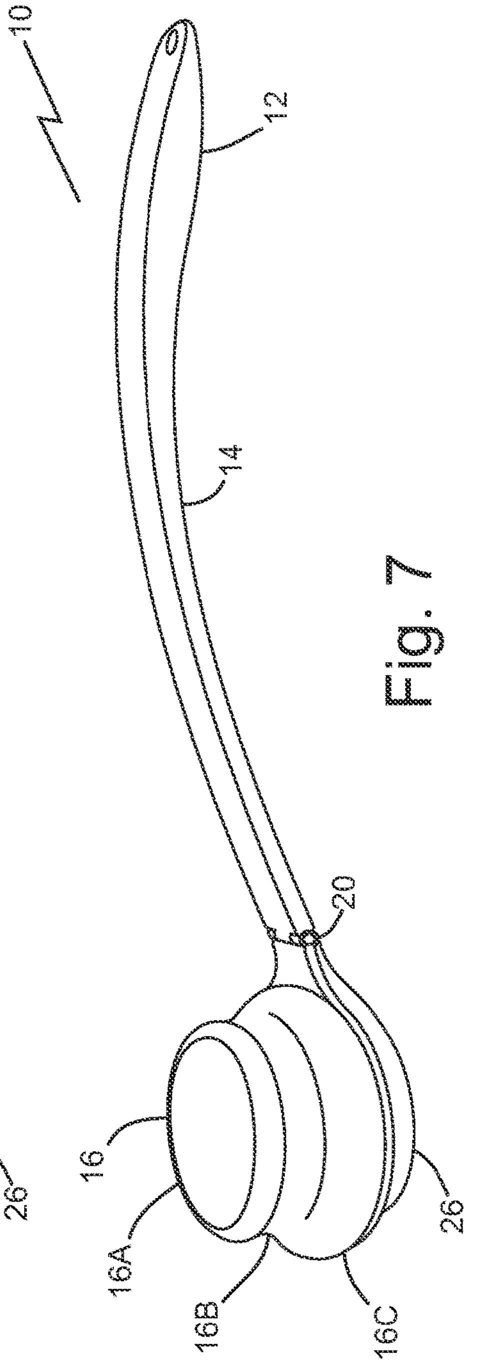

Referring to FIGS. 6-7, elongate handle part 12 may be secured to hair cutting part 16 via other suitable mechanisms, such as a threaded connection. Referring to FIG. 6, elongate handle part 12 may comprise a collar 26 that defines an access opening 26C for hair cutting part 16 to access and cut the user's hair. A base 16D or other part of handle cutting part 16 may be secured within opening 26C of collar 26 via corresponding threading 16G, 26B along an inner surface 26D of an inner wall 26A of the collar 26 and an outer surface 16P of base 16D, respectively, of the hair cutting part 16. Other suitable mechanisms may be used to reversibly connect the handle part and hair cutter part, including cables, elastics, latches, locking tabs, press fits (including interference fits), and others. Referring to FIG. 6, the threading on outer surface 16P may be the same threading that is structured to engage corresponding threading on an inner wall 97 of a cutting guard 91.

Referring to FIG. 3, the elongate handle part 12 and the hair cutting part 16 may be structured to permit the hair cutting part 16 to move relative to the elongate handle part 12. Elongate handle part 12 may be connected to pivot relative to hair cutting part 16, for example about a pivot axis, such as defined by an axle 20. Referring to FIG. 3, a portion of the elongate handle part 12, such as shaft portion 14, may pivot relative to another portion of the handle part 12, such as seat gripping part 24, for example at a pivot joint or axle 20. Elongate handle part 12 and hair cutting part 16 may pivot relative to one another about a range of angular positions, and in some cases simultaneously about a range of pivotal axes of motion. In some cases the hair cutting part 16 may be configured to pivot about an axis to any of an unlimited number of angular positions, and in other cases the part 16 may be structured to pivot about an axis into one of a discrete number of angular positions, for example a series of discrete angular positions separated by intervals of non-zero angular separation. A range of motion of plural discrete positions may be achieved with a cam or gear system on one or both portion 14 and seat gripping part 24. A lock (not shown) may be used to secure the device 10 in a selected angular position. The handle part 12 may be structured to pivot about one or more axes of motion. In one case the elongate handle part 12 is adapted to pivot through a living hinge or resilient portion of the device.

Referring to FIGS. 3A, 3B, 3C1, and 3C2, one or both the handle and hair cutting part may be structured to permit relative movement, such as a pivotal deflection, upon application of a relative torque between the two parts. Referring to FIG. 3B, one or both of the elongate handle part 12 and the hair cutting part 16 may be structured to permit the hair cutting part 16 to pivot, relative to the elongate handle part 12, from a neutral position (dashed lines), for example into a flexed position (solid lines), upon application of a pressure above a predetermined threshold, and to return to the neutral position upon release of the pressure.

Pivoting may be achieved via a suitable mechanism. Referring to FIG. 3B, such deflection may be achieved via resilient character within the handle part 12 or hair cutting part 16 or both, or by other means, such as via a torsional spring. In the example shown the handle part 12 may have a portion 99 that is made of resilient material, such as a polymeric material, that deflects under pressure, and returns to the neutral state upon release of the pressure. Deflection is understood to refer to elastic bending. The resiliency of the material may be tailored to achieve a predetermined threshold force that may be surpassed during operation using the strength of the user. In some cases the ability to return to neutral may be achieved using a spring or other biasing system, for example if a pivot hinge with a torsion spring (not shown) is provided.

Various types of relative motion may be achieved. Referring to FIG. 3B, in some cases one or both of the elongate handle part 12 and the hair cutting part 16 are structured to permit the hair cutting part 16 to pitch up and down. For example, the part 16 may be permitted to pivot about an axis 120 that is defined perpendicular to a handle part axis 124 and parallel to a plane 122 that is defined by a cutting end 90 of the hair cutting part 16. In the example shown, the handle part 12 may be curved or multi-axial, and in such cases the handle part axis 124 may be defined by the respective axis closest to the hair cutting part 16 as shown. As the user advances the hair cutting part 16 along a surface of a back 38, the hair cutting part 16 may deflect, relative to the elongate handle part 12, from a neutral position (dashed lines) into a deflected position (solid lines). The deflection may occur when the hair cutting part 16 encounters changing topography on back 38 during advancement.

Referring to FIGS. 3C1 and 3C2, one or both of the elongate handle part 12 and the hair cutting part 16 may be structured to permit the hair cutting part 16 to roll laterally, for example to the left or right. For example, the part 16 may be permitted to pivot about an axis 125 that is defined parallel, for example coaxial, to a handle part axis 124. During advancement the hair cutting part 16 may traverse sections of the user's skin that slope up or down in a direction lateral to the direction of skin travel of the hair cutting part 16 across the skin. Such topography may force the hair cutting part 16 to roll to the side as shown. Pitch and roll pivoting are examples of pivoting about axes that are perpendicular and parallel, respectively, to the elongate handle part 12. In some cases the parts 12 and 16 may be structured to pitch and roll at the same time, for example when encountering complex topography.

Figure 8:
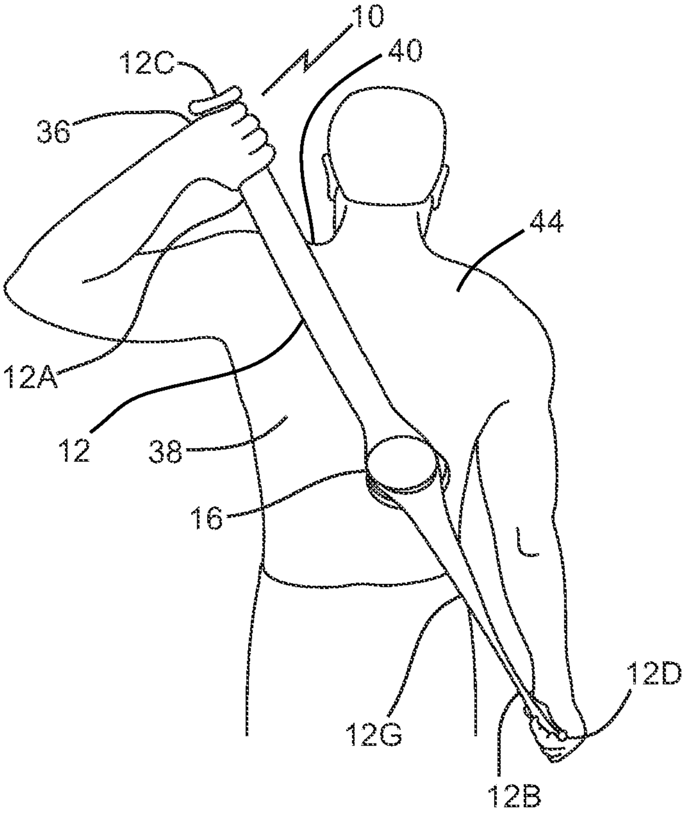
FIGS. 8 and 9 are perspective views illustrating a method of self-administered use of a sling embodiment of a back and body hair cutting device to cut hair on a back of the user.
Figure 9:
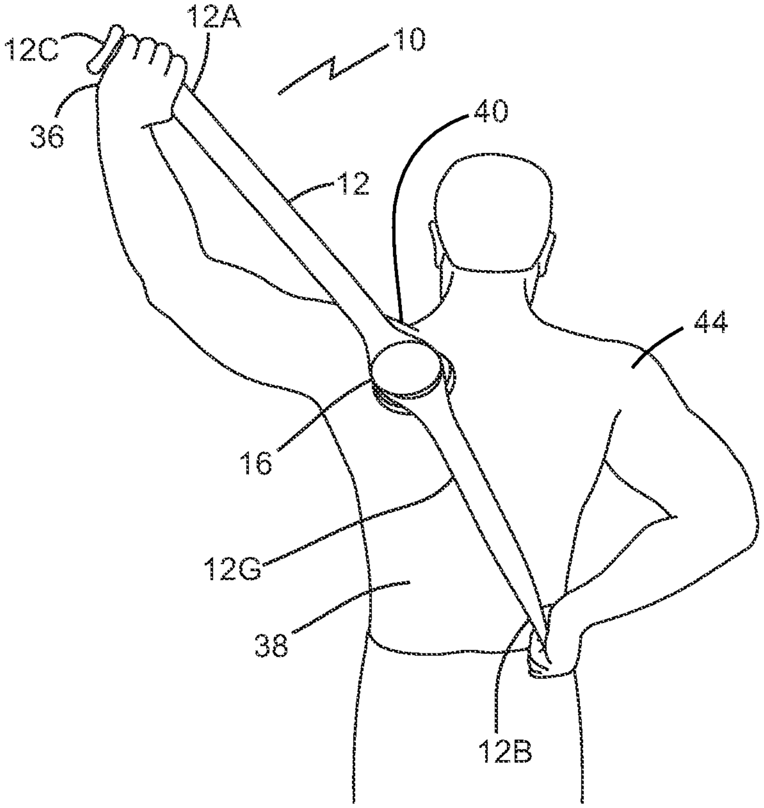
Figure 10:
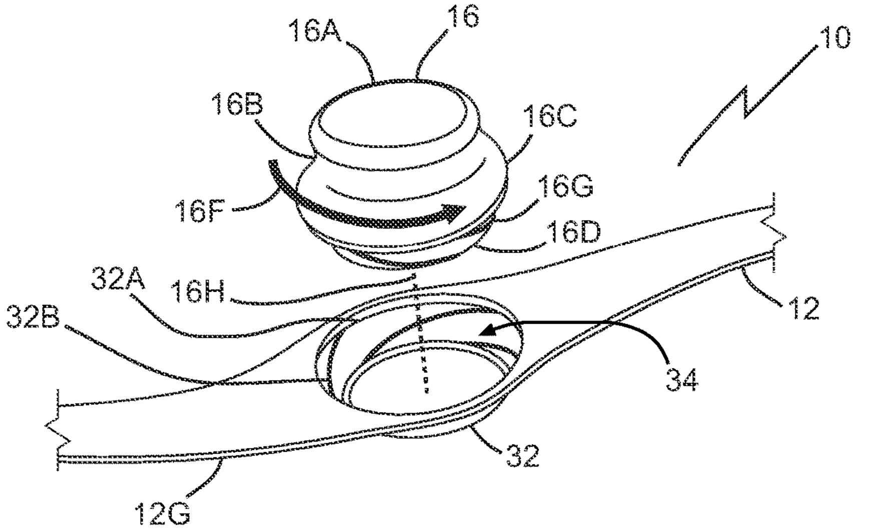
FIGS. 10 and 11 are perspective views illustrating a manner of assembling a sling handle and hair cutter, of a back and body hair cutting device, via a threaded connection.
Figure 11:
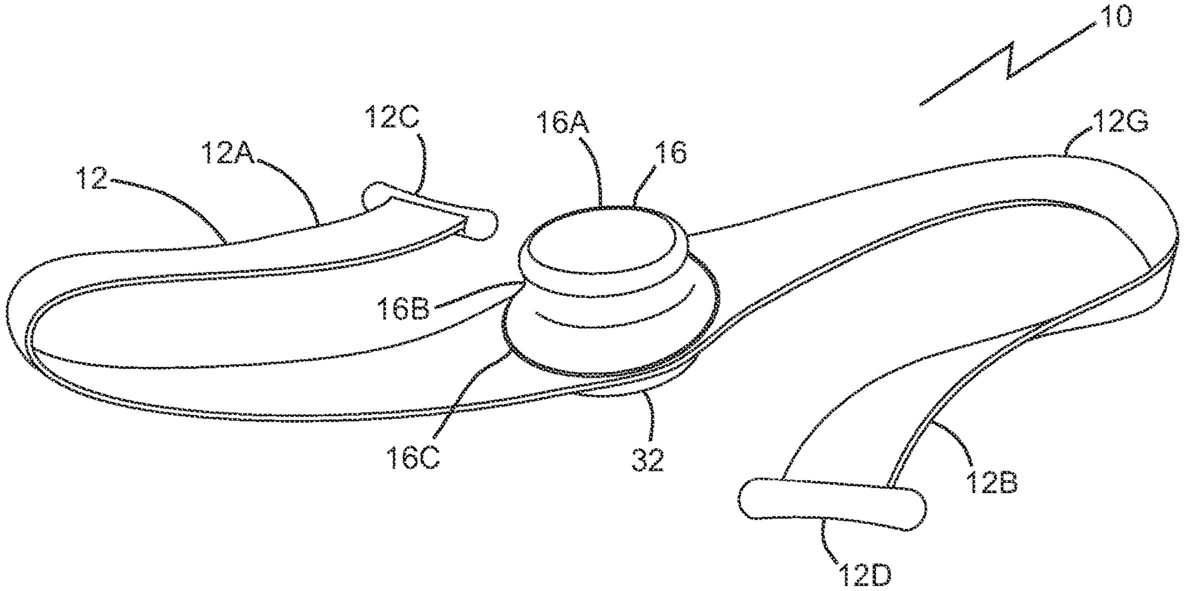
Figure 12:
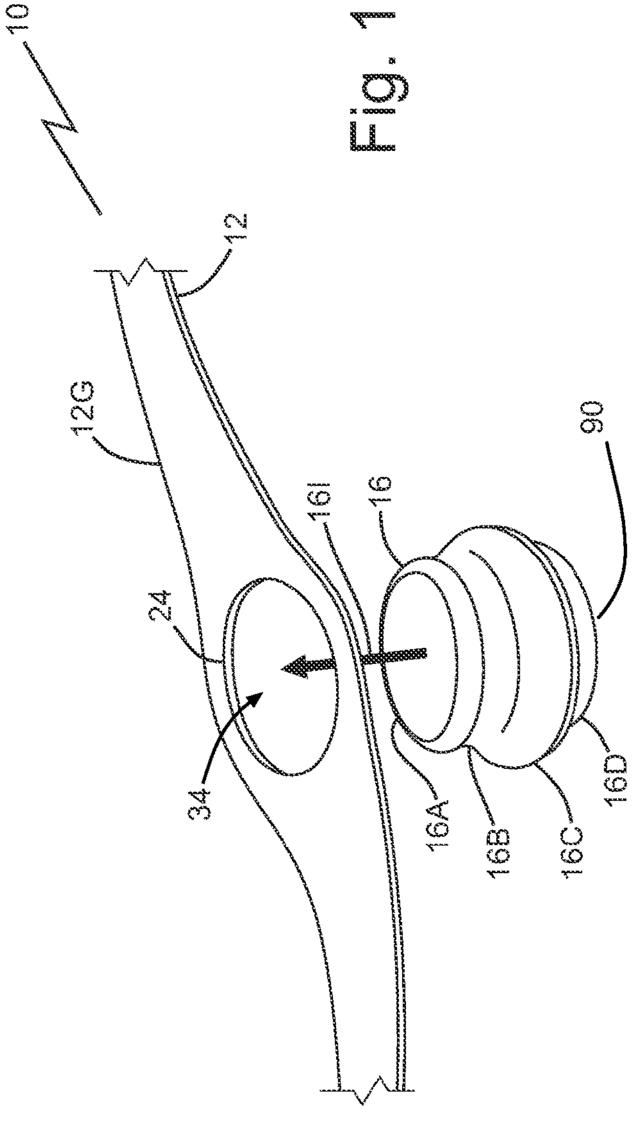
FIGS. 12 and 13 are perspective views illustrating another manner of assembling a sling handle and hair cutter, of a back and body hair cutting device, via a compression or friction fit formed by an expandable opening in the sling.
Figure 13:
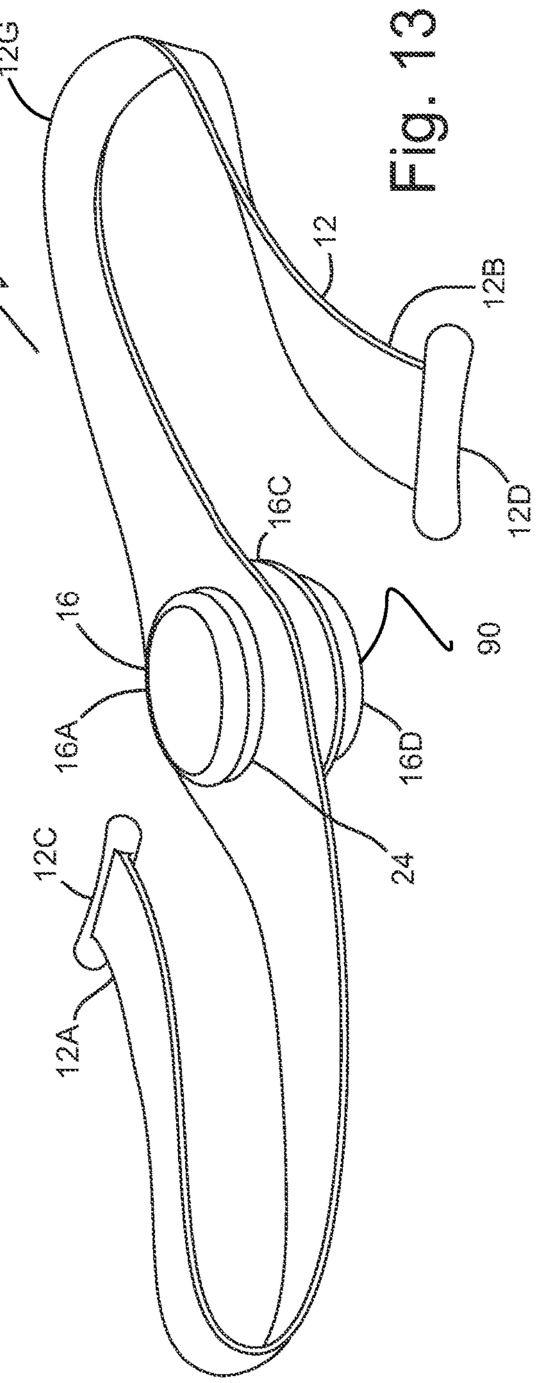

Referring to FIGS. 8-13, elongate handle part 12 may comprise a sling 12G. A sling may have a structure suitable to permit operation of hair cutting part 16 on hard to reach areas using two hands on opposite ends or parts of the handle part 12 to simultaneously apply tension through the sling and bring the hair cutting part 16 into contact with the target area. Referring to FIGS. 11, 12, and 13, sling 12G may be structured such that hair cutting part 16 attaches to sling 12G at an intermediate position, for example a central position, between opposed handle ends 12A and 12B of the sling 12G. Referring to FIGS. 8-9, each of the opposed handle ends 12A and 12B may be shaped to form a respective hand grip, such as flanges 12C, 12D, or other suitable types of hand stops, such as a rim, bar, ridge, plate, ring, loop, or collar, to facilitate the application of tension in sling 12G by a user 44 who grips and pulls opposed handle ends 12A and 12B with respective hands of the user 44. The hand stop may have a part, such as a ring or loop, that is sized to fit one, two, or more fingers, and in some cases the entire hand of the user.

Referring to FIG. 10, sling 12G may connect to the hair cutting part 16 via a suitable mechanism, for example via a threaded connection. An access opening 34 may be formed in a collar 32 formed or connected into the sling 12G. Collar 32 may mate with hair cutting part 16 via corresponding threading on hair cutting part 16 and opening 34, for example threading 16G on an outer wall surface 16P of base 16D of the hair cutting part 16 and threading 32B on an inner wall 32A of the collar 32. Collar 32 may be formed by an annular ring that mounts and extends above, below, or both above and below the sling 12G.

Referring to FIG. 12, sling 12G may connect to the hair cutting part 16 via a compression fit. Access opening 34 of sling 12G may form a compression fit with hair cutting part 16, for example such that opening 34 encircles the hair cutting part 16 at or near the hair cutting end 90 of part 16. Referring to FIGS. 10-13, sling 12G may be adapted to have resilient or flexible properties to facilitate the compression fit. Referring to FIG. 12, upon installation opening 34 defined by sling 12G may expand by stretching to permit entry of hair cutting part 16, for example in a direction 161. Referring to FIG. 13, once in a secured operating position the sling 12G may or may not form a compression fit about opening 34. Opening 34 may encircle stem 16B between flanged ends 16A and 16C of hair cutting part 16 when mounted to hair cutting part 16. Sling 12G may comprise an elastomeric material, for example rubber, silicone, or other suitable material. Sling 12G may be formed of flexible material, such as in the case where sling 12G forms a belt, and sling 12G may or may have resilient properties.

Referring to FIGS. 1-2, elongate handle part 12 may be integrally attached to hair cutting part 16. In some cases a handle part 16 may incorporate a sling extended from one end of hair cutting part 16, and a rigid or resilient handle extended from the other end. Back and body hair cutting device 10 may have a center of gravity defined within hair cutting part 16, and in some cases within collection chamber 16M, and between the pair of cooperating ring cutters 16J and flanged end 16C, for example to balance the hair cutting part 16 against a user's skin surface Back and body hair cutting device 10 may have a watertight seal around electronic and other water-sensitive components, for example to permit back and body hair cutting device 10 to be used near a water source such as a shower. Sling 12G may form a band. Sling 12G may form a pair of tethers, for example that extend in opposed directions. The sling may be formed by a chain, rope, cable, sheet, tether or other part with suitable properties. The sling may or may have a loop.

Referring to FIG. 3, elongate handle part 12 may be adapted to hang or secure to a wall, for example via a hole or aperture 18. Elongate handle part 12 may comprise one or more hand grip parts, such as textured surfaces with ridges or other friction-increasing elements, to increase grip and comfort. Elongate handle part 12 may comprise a shaft, which may be straight, curved, or both. Elongate handle part 12 may be used to reach and cut hair on areas of the body other than the back, such as the legs, buttocks, and head. Elongate handle part 12 may be length adjustable, for example telescopic, for further example to accommodate backs of different sizes. In one example, the handle part 12 is able to be set to a desired length and locked into place, for example so the user may select a shorter length for reaching areas that are slightly out of reach, and a longer length for reaching areas that are relatively further out of reach. Elongate handle part 12 may comprise an on/off switch, for example that is electrically connected to hair cutting part 16 or at a suitable location on handle part 12.

Figure 14:
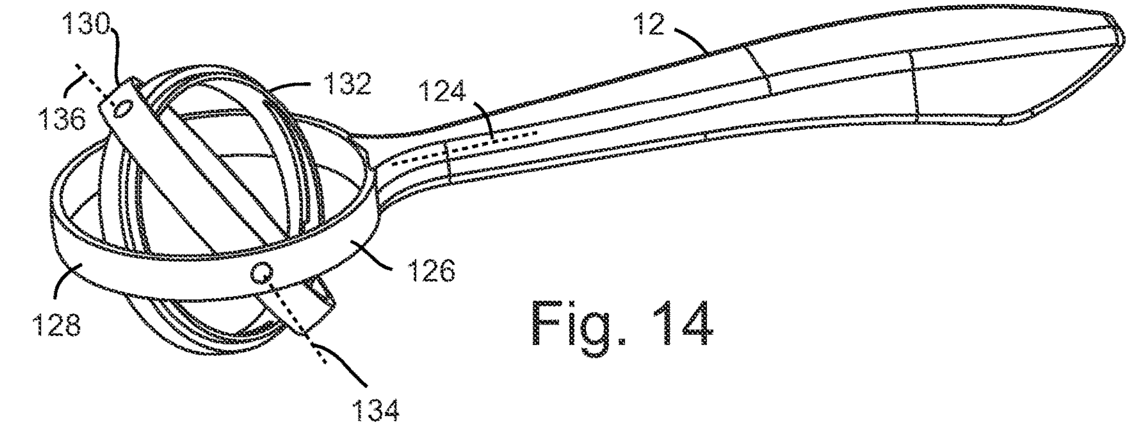
FIG. 14 is a perspective view of an embodiment of a back and body hair cutting device with a gimbal, and with the hair cutting part omitted for clarity.

Referring to FIGS. 14 and 14A-14D, the elongate handle part 12 may be structured to permit pivoting of the hair cutting part 16 about a plurality of axes, for example the elongate handle part 12 may be connected for omni-directional pivoting relative to the hair cutting part 16. Omnidirectionality in this document may refer to the ability of one part, such as part 12, to pivot in any angle about a plane (for example plane 142 in FIG. 14A) relative to another part, such as the cutting part 16. One structure that permits such movement is a gimbal 126. The gimbal 126 may comprise a multi-axis, for example dual or tri-axis, concentric ring gimbal set. Referring to FIG. 14, the gimbal set may comprise an outer ring 128, an intermediate ring 130 nested within the outer ring 128, and an inner ring 132 nested within the outer ring 128. The rings 128, 130, and 132 each form respective gimbals. The outer ring 128 may be connected to pivot relative to the handle part 12 about handle axis 124, or as shown, outer ring 128 may be rigidly connected to handle part 12, in which case rotation of handle part 12 about axis 124 rotates outer ring 128. The intermediate ring 130 may be mounted to pivot relative to outer ring 128 about a first axis 134, for example defined perpendicular to handle part axis 124. The inner ring 132 may be mounted to pivot relative to intermediate ring 128 about a second axis 136, for example that is defined perpendicular to the first axis 134. The inner ring 132 may be connected to the hair cutting part 16, for example via a threaded connection, friction fit, latching connection, or other suitable mechanism. Two or more gimbals may be present. The gimbals are shown as rings in the examples, but in other cases the gimbals may be other than rings, for example semi-rings, arcuate parts, or angled beams. Springs or other biasing members may be used to mount the gimbals together, for example torsion springs between rings to bias the rings back into the neutral position. Stoppers (not shown) may be used to restrict ranges of pivoting motion between parts.

Figure 14A:
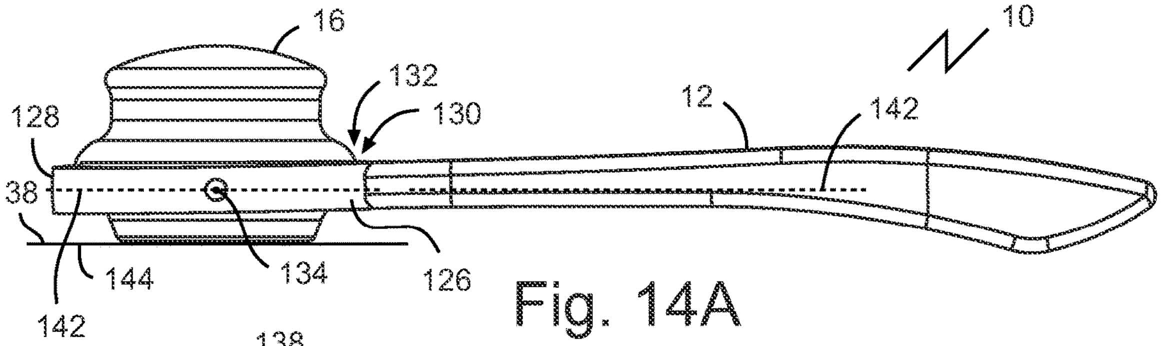
FIG. 14A is a side elevation view of the device of FIG. 14 on a flat surface, with a hair cutting part mounted on the gimbal and the gimbal in a neutral position.
Figure 14B:
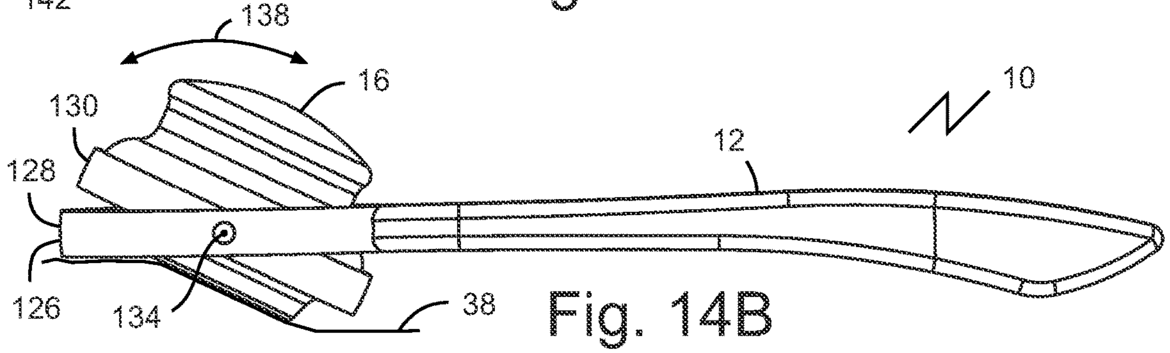
FIG. 14B is a side elevation view of the device of FIG. 14A illustrating pitching (up and down) pivoting movement of the hair cutting part relative to the handle part when climbing a sloped surface.
Figure 14C:
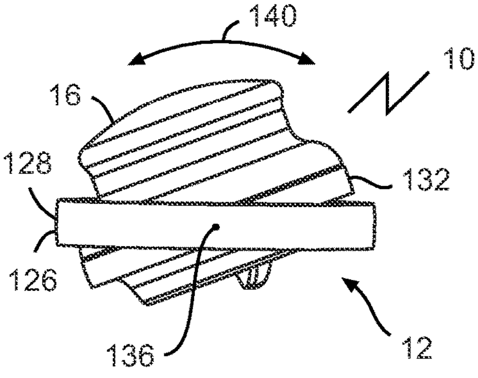
FIG. 14C is a front elevation view of the device of FIG. 14A illustrating rolling (lateral) pivoting movement of the hair cutting part relative to the handle part.
Figure 14D:
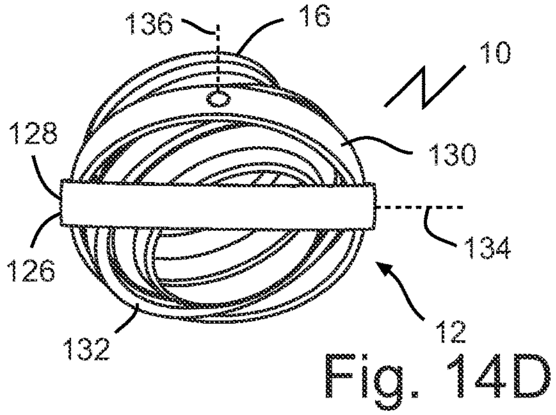
FIG. 14D is a front elevation view of the device of FIG. 14 illustrating simultaneous pitching and rolling pivotal movement of the hair cutting part relative to the handle part.

Referring to FIGS. 14B-D, the outer ring 128, the intermediate ring 130, and the inner ring 132 may be adapted to permit the orientation of the hair cutting part 16 to follow the contour of the user's skin, for example located on the user's back 38. Each ring 128, 130, and 132 may be mounted to pivot relative to the other rings. Referring to FIG. 14A, the rings 128, 130, and 132 may be connected and structured to assume a neutral position as shown, where each ring lies in a single plane 142 in a concentric nested fashion, such as is assumed in the figure shown where the hair cutting part 16 is being moved along a flat surface that defines a plane 144 that is parallel to the nesting plane 142. Referring to FIG. 14B, the intermediate ring 130 may pivot along directional lines 138 about axis 134 to permit the hair cutting part 16 to pitch up and down as shown. Referring to FIG. 14C, the inner ring 132 may pivot along directional lines 140 about axis 136 to permit the hair cutting part 16 to roll laterally, for example to the left or right. Referring to FIG. 14D, multi-axial pivoting movements may be permitted, such as is shown where the intermediate ring 130 is pivoted relative to the outer ring 128 about axis 134, and at the same time the inner ring 132 is pivoted relative to intermediate ring 130 about axis 136, to demonstrate a pitch and roll movement of the hair cutting part 16 relative to the handle part 12.

Other types of omni-directional pivoting parts may be used. For example, a ball joint or universal joint may be used. An example of a ball joint is formed on the handle end of the EVENCUT™ device, for example using a cap that fits over the handle end to define an external surface whose shape follows that of a sphere, ellipsoid, ball, or other surface that provides omni-directional pivoting, for a handle connector part to engage and slide over, similar to a hip or shoulder joint.

Elongate handle part 12 may comprise a U-joint. Elongate handle part 12 may comprise a pair or more of handle parts joined at a pivot joint such that the pair of handle parts may pivot relative to one another. Elongate handle part 12 may be shaped and sized to permit hair cutting part 16 to reach back 38, for example lower back 38C, mid-back 38B, or upper back 38A, of the user 44 while one or both of the following extend backward over shoulder 40 of the user 44: a) elongate handle part 12 and b) the hand 36 of the user 44 that grips elongate handle part 12. A reversible locking part may have any one or more of a latch, a locking tab, or a twist lock. Reversible excludes fastening or securing methods that cause damage upon separation.

Hair cutting part 16 may form a cutting head assembly. Hair cutting part 16 may comprise a head, a neck, and a shoulder. The neck of hair cutting part 16 may have a smaller diameter than the head and/or shoulder of the hair cutting part 16. Hair cutting part 16 may be an off-the-shelf hair cutting device, such as the EVEN CUT™ device manufactured by CONAIR™, which may be retrofitted with handle part 12. Hair cutting part 16 may be adapted to shave in up to 360 degrees of direction. Hair cutting part 16 may be structured to swivel in any direction. Connecting includes securing and vice versa. A single bladed embodiment may be used, as may be embodiments with two or more blades. An embodiment may be used where two reciprocating, oscillating, or otherwise movable blades cooperate to create a shearing action.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A back and body hair cutting device comprising:
- a hair cutting part that has a multi-directional motorized blade that is shaped to define a multi-directional cutting profile, with the multi-directional cutting profile having a plurality of segments, with each segment defining a respective direction of hair-cutting travel, of a plurality of directions of hair-cutting skin travel, that is perpendicular to the segment and along which the hair cutting part is advanceable over a skin surface to cut hair at the segment, with two or more segments being oriented non-parallel relative to one another, such that the motorized blade is configured to cut hair when advanced over the skin surface in each of the plurality of directions of hair-cutting skin travel;
- an elongate handle part sized to permit a user to remotely manipulate the hair cutting part into contact with all areas of a back of the user; and
- in which:
  - the elongate handle part forms a sling and a seat gripping part;
  - the multi-directional motorized blade is configured to cut hair while being advanced in any direction of skin travel within a 360 degree range of direction of skin travel;
  - the hair cutting part forms a seat for receiving the seat gripping part of the elongate handle part; and
  - one or both of the seat gripping part and the hair cutting part are structured for omni-directional pivoting, during cutting, of the hair cutting part relative to the elongate handle part.

2. The back and body hair cutting device of claim 1 in which the plurality of directions of hair-cutting skin travel include a forward direction, a first lateral direction ninety degrees to the left of the forward direction, and a second lateral direction ninety degrees to the right of the forward direction.

3. The back and body hair cutting device of claim 1 in which:
- the elongate handle part is removable from, and securable by a reversible connector to, the hair cutting part;
- the hair cutting part has ends spaced by a stem, with one of the ends forming a palm grip that narrows to the stem and then widens to the other end, and the other of the ends mounting the multi-directional motorized blade.

4. The back and body hair cutting device of claim 1 in which the sling is structured to attach the hair cutting part to an intermediate position between opposed handle ends of the sling.

5. The back and body hair cutting device of claim 4 in which each of the opposed handle ends is shaped to form a respective hand grip.

6. The back and body hair cutting device of claim 5 in which each respective hand grip comprises a flange.

7. The back and body hair cutting device of claim 1 in which the sling comprises an elastomeric material.

8. The back and body hair cutting device of claim 1 in which the seat gripping part defines an access opening that receives, and forms a compression fit with, the hair cutting part.

9. The back and body hair cutting device of claim 1 in which the elongate handle part has a length of at least one foot.

10. The back and body hair cutting device of claim 1 in which the elongate handle part has parts that are structured to permit a length of the elongate handle part to be adjustable.

11. A method comprising operating an elongate handle part to manipulate a hair cutting part into contact with a back of the user to cut hair on the back of the user, in which the hair cutting part has a multi-directional motorized blade that is shaped to define a multi-directional cutting profile, with the multi-directional cutting profile having a plurality of segments, with each segment defining a respective direction of hair-cutting skin travel, of a plurality of directions of hair-cutting skin travel, that is perpendicular to the segment and along which the hair cutting part is advanced over a skin surface to cut hair at the segment, with two or more segments being oriented non-parallel relative to one another, such that the multi-directional motorized blade cuts hair when advanced over the skin surface in each of the plurality of directions of hair-cutting skin travel, in which the elongate handle part forms a sling and a seat gripping part, in which the multi-directional motorized blade is configured to cut hair while being advanced in any direction of skin travel within a 360 degree range of direction of skin travel;
- in which the hair cutting part forms a seat for receiving the seat gripping part of the elongate handle part; and
- one or both of the seat gripping part and the hair cutting part are structured for omni-directional pivoting, during cutting, of the hair cutting part relative to the elongate handle part.

12. The method of claim 11 in which operating comprises cutting hair in a handheld mode where the user grips the hair cutting part with the user's hand.

13. The method of claim 12 in which operating comprises an extension mode in which the elongate handle part grips the hair cutting part.

14. The method of claim 12 further comprising connecting the elongate handle part to the hair cutting part by either:
- threading the elongate handle part to the hair cutting part; or
- connecting a split ring or ring, of the elongate handle part, to the hair cutting part.

15. The method of claim 12 in which the hair cutting part is connected to the sling at an intermediate position between opposed handle ends of the sling, and operating comprises gripping the opposed handle ends with respective hands of the user.

16. The method of claim 11 in which operating comprises pivoting the elongate handle part relative to the hair cutting part.

* * * * *